US012209440B2

(12) United States Patent
Marlia

(10) Patent No.: US 12,209,440 B2
(45) **Date of Patent: *Jan. 28, 2025**

(54) SMART LATCH ASSEMBLY WITH WINDOW REGULATOR CONTROL

(71) Applicant: Magna Closures Inc., Newmarket (CA)

(72) Inventor: Marco G. Marlia, Collesalvetti (IT)

(73) Assignee: Magna Closures Inc., Newmarket (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,606

(22) Filed: May 3, 2023

(65) Prior Publication Data

US 2023/0265689 A1 Aug. 24, 2023

Related U.S. Application Data

(63) Continuation of application No. 16/801,478, filed on Feb. 26, 2020, now Pat. No. 11,674,339.

(60) Provisional application No. 62/810,577, filed on Feb. 26, 2019.

(51) Int. Cl.

*E05B 1/00* (2006.01)
*E05B 81/66* (2014.01)
*E05B 47/00* (2006.01)

(52) U.S. Cl.

CPC ...... *E05B 81/66* (2013.01); *E05B 2047/0094* (2013.01); *E05Y 2400/36* (2013.01); *E05Y 2900/532* (2013.01); *E05Y 2900/55* (2013.01)

(58) Field of Classification Search

CPC .......... E05B 81/56; E05B 81/66; E05B 81/06; E05B 2047/0094; E05Y 2900/532; E05Y 2900/55; E05Y 2400/36

See application file for complete search history.

(56) References Cited

U.S. PATENT DOCUMENTS

| | | | | |
|---|---|---|---|---|
| 10,745,947 | B2 * | 8/2020 | Okeke | E05B 17/007 |
| 11,674,339 | B2 * | 6/2023 | Marlia | E05B 81/06 701/49 |
| 11,970,887 | B2 * | 4/2024 | Reusch | E05B 81/66 |
| 2007/0187001 | A1 * | 8/2007 | Kramer | C25D 11/24 148/247 |
| 2010/0007463 | A1 * | 1/2010 | Dingman | E05B 81/78 340/425.5 |
| 2016/0153212 | A1 * | 6/2016 | Bingle | E05B 81/06 292/201 |
| 2018/0187463 | A1 * | 7/2018 | Schmidt | E05B 77/36 |

(Continued)

*Primary Examiner* — Chi Q Nguyen

(74) *Attorney, Agent, or Firm* — Dickinson Wright PLLC

(57) ABSTRACT

A latch assembly for a closure panel of a motor vehicle and corresponding method of operation are provided. The latch assembly includes a latch housing for attachment to the closure panel and contains an actuation group to latch and unlatch the closure panel. An electronic control circuit that has a latch controller is disposed within the latch housing and is coupled to the at least one actuation group. The electronic control circuit includes a motor voltage and current sensing circuit for sensing a motor current and a motor voltage of a remote electric motor disposed remotely from the latch housing. The latch controller monitors and controls the actuation group and determine at least one of a motor rotational position and a motor speed of the remote electric motor based on at least one of the motor current signal and the motor voltage signal and controls the remote electric motor accordingly.

20 Claims, 16 Drawing Sheets

(56) References Cited

U.S. PATENT DOCUMENTS

| | | | | |
|---|---|---|---|---|
| 2018/0291651 | A1* | 10/2018 | Vande Haar | E05B 47/0012 |
| 2020/0332570 | A1* | 10/2020 | Tomaszewski | E05B 81/34 |
| 2023/0220705 | A1* | 7/2023 | Farnesi | E05B 77/26 70/278.7 |
| 2023/0220717 | A1* | 7/2023 | Cetnar | E05B 81/20 49/70 |

* cited by examiner

SMART LATCH ASSEMBLY WITH WINDOW REGULATOR CONTROL

CROSS-REFERENCE TO RELATED APPLICATION

This application is a continuation of U.S. patent application Ser. No. 16/801,478, filed Feb. 26, 2020, now U.S. Pat. No. 11,674,339, issued on Jun. 13, 2023, which claims the benefit of U.S. Provisional Application No. 62/810,577 filed Feb. 26, 2019. The entire disclosure of each of the above applications is incorporated herein by reference.

FIELD

The present disclosure relates generally to an electrical latch assembly for a closure panel of a vehicle, in particular to a latch assembly and method of monitoring and controlling a remote electric motor disposed remotely from the latch assembly with a latch controller of the latch assembly.

BACKGROUND

This section provides background information related to the present disclosure which is not necessarily prior art.

A motor vehicle door typically includes a structural door body having an outer sheet metal door panel and an inner sheet metal door panel, a plurality of hardware components mounted within an internal cavity formed in the structural door body between the inner and outer door panels, and an interior trim panel. The complete assembly of the door involves multiple manufacturing steps and numerous parts. Conventionally, an original equipment manufacturer (OEM) was required to install each individual hardware component and the trim panel to the structural door body as it travelled along an assembly line. This conventional installation process had several drawbacks. First, high assembly cycle times were required to assemble the vehicle door since installation of each hardware component was required. Second, the operability of the hardware components could not be tested until the installation and assembly process was completed. Third, each hardware component had to be inventoried and managed at the OEM assembly facility.

To address these concerns, many modern vehicle doors now include a door module having a carrier onto which most of the hardware components (both mechanical and electrical) are pre-assembled. Once assembled onto the carrier, the operability of the hardware components can be tested prior to installing the door module into the structural door body. Thereafter, the door module is installed within the internal cavity of the structural door body. An example of a conventional door module is disclosed in U.S. Pat. No. 9,132,721. Some of the mechanical and electrical hardware components and assemblies commonly associated with conventional pre-assembled door modules can include, without limitation, the latch assembly, the outside door handle and its mechanical connections (outside release Bowden cable and/or rods) to the latch assembly, the key cylinder and its related mechanical connectors to the latch assembly, the anti-theft device, the chassis presenter, the inside door handle and its mechanical connections (inside release Bowden cable and/or rods) to the latch assembly, and a window regulator unit. In many higher-end vehicles the latch assembly and the window regulator unit are equipped with a powered actuator, such as an electric motor, which are electrically connected to a controller via wiring harnesses.

In view of the above, pre-assembled door modules have proven to provide a successful alternative to the conventional OEM door assembly processing. However, door modules can become quite heavy and complicated. Further, advances in electrically-actuated door latch assemblies equipped with motor-driven power release and cinch functionality have further complicated the design of door modules since mechanical back-up systems are still typically provided. In view of the continued development of fully electrical latches, referred to as latches, some of the mechanical linkages to the inside and outside door handles have been eliminated since the latch is released by energization of a powered release actuator in response to an electrical signal from the handle or a fob associated with a passive entry system.

Furthermore, the window regulators and other power operated actuators commonly used in the door modules have additionally become more advanced. For example, such power operated actuators may utilize mechanically commutated direct current (DC) motors. In many of these applications, it is desirable to monitor a rotational position and/or speed of a shaft of the motor to more accurately control movement of a mechanism of the power operated actuator (e.g., position of a window moveable by the window regulator), to provide "short drop" movement of a window in a frameless door and/or prevent possible pinch conditions as the window is closed. However, such monitoring and accurate control movement typically necessitates that the window regulator also include its own controller, which further adds to the weight and complexity of the door modules.

Accordingly, there remains a need for improved latch assemblies used in door modules with corresponding methods of operation thereof that overcome these shortcomings.

SUMMARY

This section provides a general summary of the present disclosure and is not a comprehensive disclosure of its full scope or all of its features and advantages.

It is an object of the present disclosure to provide a latch assembly and a method of operating the latch assembly that address and overcome the above-noted shortcomings.

Accordingly, it is an aspect of the present disclosure to provide a latch assembly for a closure panel of a motor vehicle. The latch assembly includes a latch housing for attachment to the closure panel. At least one actuation group is disposed within the latch housing and is movable to latch and unlatch the closure panel. An electronic control circuit that has a latch controller is disposed within the latch housing and is coupled to the at least one actuation group. The latch controller is also coupled to at least one remote electric motor of a remote motor assembly disposed remotely from the latch housing. The latch controller is configured to monitor and control the at least one actuation group and monitor and control the at least one remote electric motor.

According to another aspect of the disclosure, a door module of a closure panel of a motor vehicle is provided. The door module includes a carrier for attachment to the closure panel. A window regulator is coupled to the carrier and includes a remote motor assembly having a remote electric motor for moving a window of the closure panel. A latch assembly including a latch housing is coupled to the carrier and includes at least one actuation group disposed in the latch housing and movable to latch and unlatch the closure panel. The latch assembly includes an electronic control circuit that has a latch controller disposed within the latch housing and coupled to the at least one actuation group and coupled to the remote electric motor. The latch controller is configured to monitor and control the at least one actuation group and monitor and control the remote electric motor.

According to another yet aspect of the disclosure, a method of operating a latch assembly of a closure panel of a motor vehicle is also provided. The method includes the step of monitoring and controlling at least one actuation group of the latch assembly disposed within a latch housing of the latch assembly and being movable to latch and unlatch the closure panel using an electronic control circuit having a latch controller disposed within the latch housing. The method continues with the step of sensing at least one of a motor rotational position and a motor speed of at least one remote electric motor disposed remotely from the latch housing. The method also includes the step of controlling the at least one remote electric motor using the at least one of a motor rotational position and a motor speed of the at least one remote electric motor 74 using the latch controller.

According to an additional aspect of the disclosure, a system for controlling at least one actuator assembly for a closure panel of a motor vehicle is also provided. The system includes a latch assembly comprising an electronic control circuit having a latch controller disposed within a latch housing and coupled to at least one actuation group. The system also includes at least one remote electric motor of the at least one actuator assembly in electrical connection with the electronic control circuit, each of the at least one remote electric motor is housed within a remote motor assembly disposed remotely from the latch housing. The latch controller is configured to monitor and control the at least one actuation group and monitor and control the at least one remote electric motor.

According to an additional aspect of the disclosure, a vehicle door, or closure panel, assembly is provided, the vehicle door assembly including a latch assembly comprising an electronic control circuit having a latch controller disposed within a latch housing and coupled to at least one actuation group, the latch assembly for latching or unlatching the vehicle door assembly to a vehicle body. The vehicle door assembly also includes at least one remote electric motor of the at least one actuator assembly in electrical connection with the electronic control circuit, each of the at least one remote electric motor is housed within a remote motor assembly disposed remotely from the latch housing. The latch controller is configured to monitor and control the at least one actuation group and monitor and control the at least one remote electric motor. The vehicle door assembly may not be provided with another electronic control circuit remote from the latch assembly for controlling the at least one remote electric motor. The vehicle door assembly may not be provided with a Door Control Module (DCM) or a Latch Control Module (LCM) remote from the latch assembly.

According to an additional aspect of the disclosure, a system for controlling at least one actuator assembly for a closure panel of a motor vehicle is also provided. The system includes a latch assembly comprising an electronic control circuit having a latch controller disposed within a latch housing and coupled to at least one actuation group, the latch controller electrically coupled to a vehicle management unit remote from the closure panel. In a configuration, the latch controller is directly electrically coupled to the vehicle management unit remote from the closure panel. The system also includes at least one remote electric motor of the at least one actuator assembly in electrical connection with the electronic control circuit, each of the at least one remote electric motor is housed within a remote motor assembly disposed remotely from the latch housing. In a configuration, the latch controller is directly electrically coupled to the at least one remote electric motor of the at least one actuator assembly remote from the latch assembly. The latch controller is configured to monitor commands from the vehicle management unit and control the at least one actuation group and control the at least one remote electric motor based on receiving commands from the vehicle management unit. In a configuration, the at least one remote electric motor is free of electrical connections to at least one of a Door Control Module, a Latch Control Module, and the vehicle management unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a latch assembly of the type well-suited for use in many applications. The latch assembly and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1A:
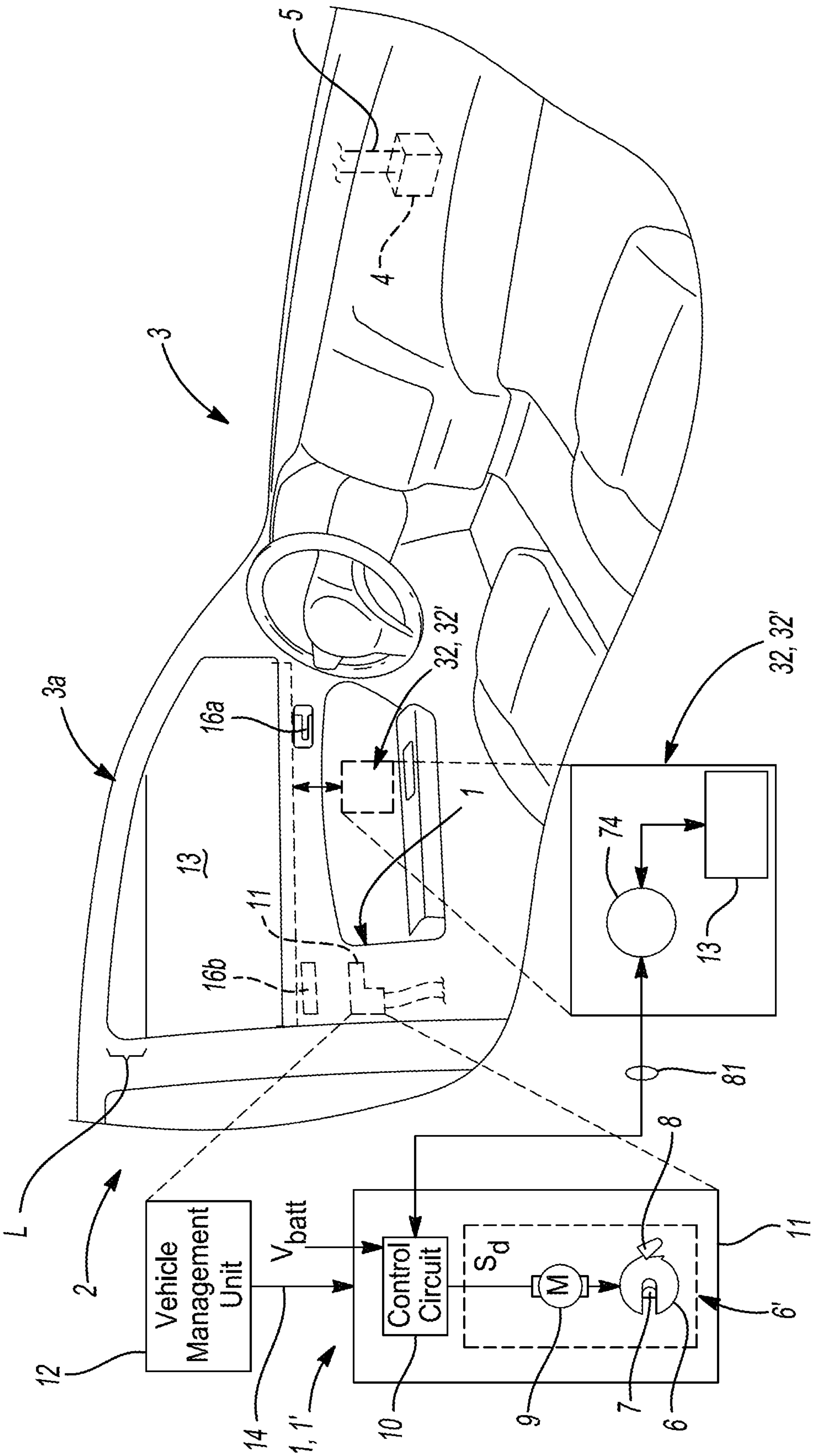
FIG. 1A is a schematic representation of a motor vehicle with a closure panel and a latch assembly according aspects of the disclosure.

As best shown in FIG. 1A, a latch assembly 1, 1', referred to as a "Smart Latch" or e-latch, is coupled to a closure panel (e.g., side door 2) of a motor vehicle 3. However, it should be understood that the latch assembly 1, 1' may equally be coupled to any kind of closure device or panel of the motor vehicle 3 (e.g., see also FIG. 1B). The latch assembly 1, 1' is electrically connected to a main power source 4 of the motor vehicle 3, for example a main battery providing a battery voltage Vbatt of 12 V, through an electrical connection element 5, for example a power cable (the main power source 4 may equally include a different source of electrical energy within the motor vehicle 3, for example an alternator).

The latch assembly 1, 1' includes at least one actuation group 6' disposed within the latch housing 11, including a latch electric motor 9, operable to control actuation of the door 2 (or in general of the closure panel 2, 2' to latch and unlatch the closure panel 2, 2'). As shown, the at least one actuation group 6' includes a ratchet 6, which is selectively rotatable to engage a striker 7 (fixed to the body 3*a* of the motor vehicle 3, for example to the so called "A pillar" or "B pillar", in a manner not shown in detail). When the ratchet 6 is rotated into a latching position with respect to the striker 7 (i.e., a primary position of the ratchet 6), the side door 2 is in a closed operating state. A pawl 8 selectively engages the ratchet 6 to prevent it from rotating, driven by the latch electric motor 9, so as to move between an engaged position and a non-engaged position. The ratchet 6 may also be driven in order to cinch the closure panel 2, 2' relative to the body 3*a* of the motor vehicle 3.

The latch assembly 1, 1' further includes an electronic control circuit 10, which may be conveniently embedded and arranged in a latch housing 11 (shown schematically) with the at least one actuation group 6' of the latch assembly 1, 1', thus providing an integrated compact and easy-to-assemble unit.

The electronic control circuit 10 is coupled to the latch electric motor 9 of the at least one actuation group 6' and provides driving signals Sd thereto. The electronic control circuit 10 is also electrically coupled to a main vehicle management unit 12 (also known as main ECU or "vehicle body computer" or Body Control Module or BCM), which is configured to control general operation of the motor vehicle 3, via a data bus 14, so as to exchange signals, data, commands and/or information.

Figure 1B:
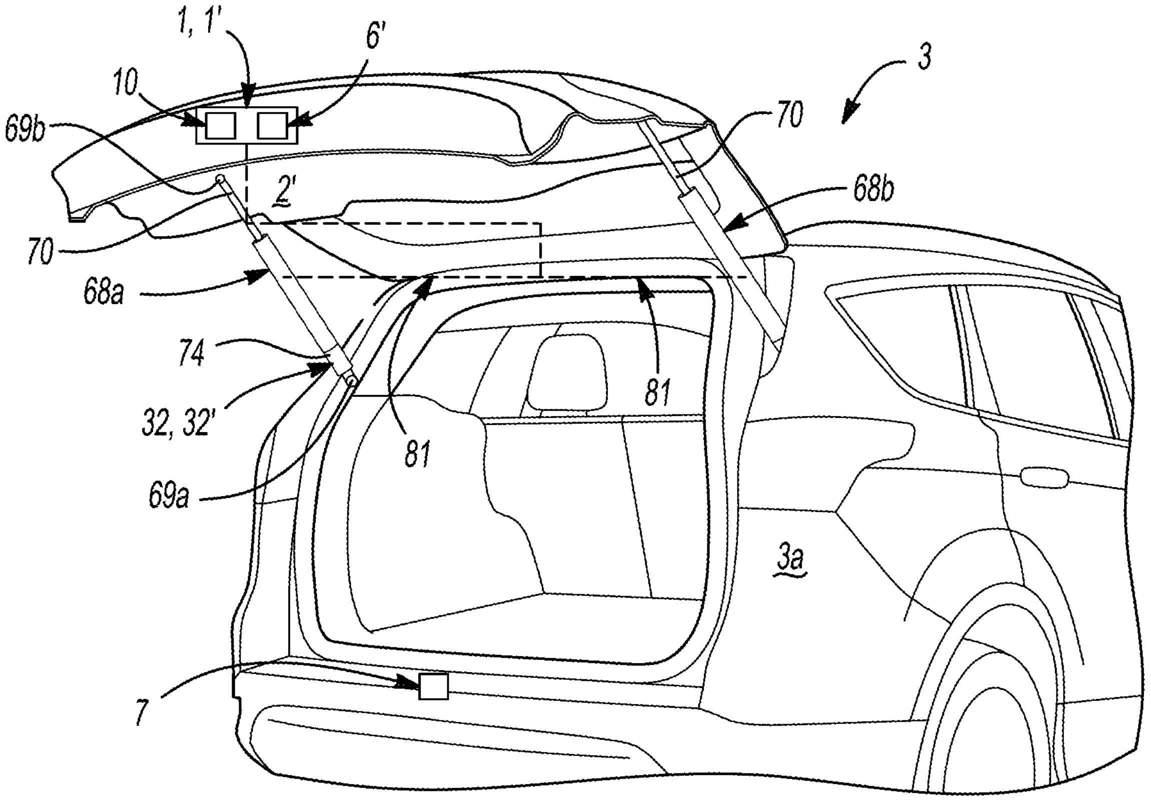
FIG. 1B is a schematic representation of the motor vehicle with another closure panel and latch assembly according aspects of the disclosure.

The closure panel (e.g., side door 2) additionally includes a window 13 coupled thereto and movable between at least a fully open position and a fully closed position and a short drop position in which the window 13 moves a predetermined distance L below the fully closed position. More specifically, if the door 2 does not include a frame completely surrounding the window 13 (i.e., a frameless window 13), an upper edge of the window 13 engages an upper frame of a body 3*a* of the motor vehicle 3 (i.e., upper portion of an opening in which the window 13 is disposed) when the window 13 is in the fully closed position. Alternatively, the window 13 can engage an upper portion of the door 2, if the door 2 includes a frame surrounding the window 13 (i.e., not a frameless window). FIG. 1B shows another arrangement for latch assembly 1, 1'. Again, the latch assembly 1, 1' is coupled to the closure panel (e.g., lift gate 2') of the motor vehicle 3. Thus, the lift gate 2' can be latched to the striker 7.

Figure 2:
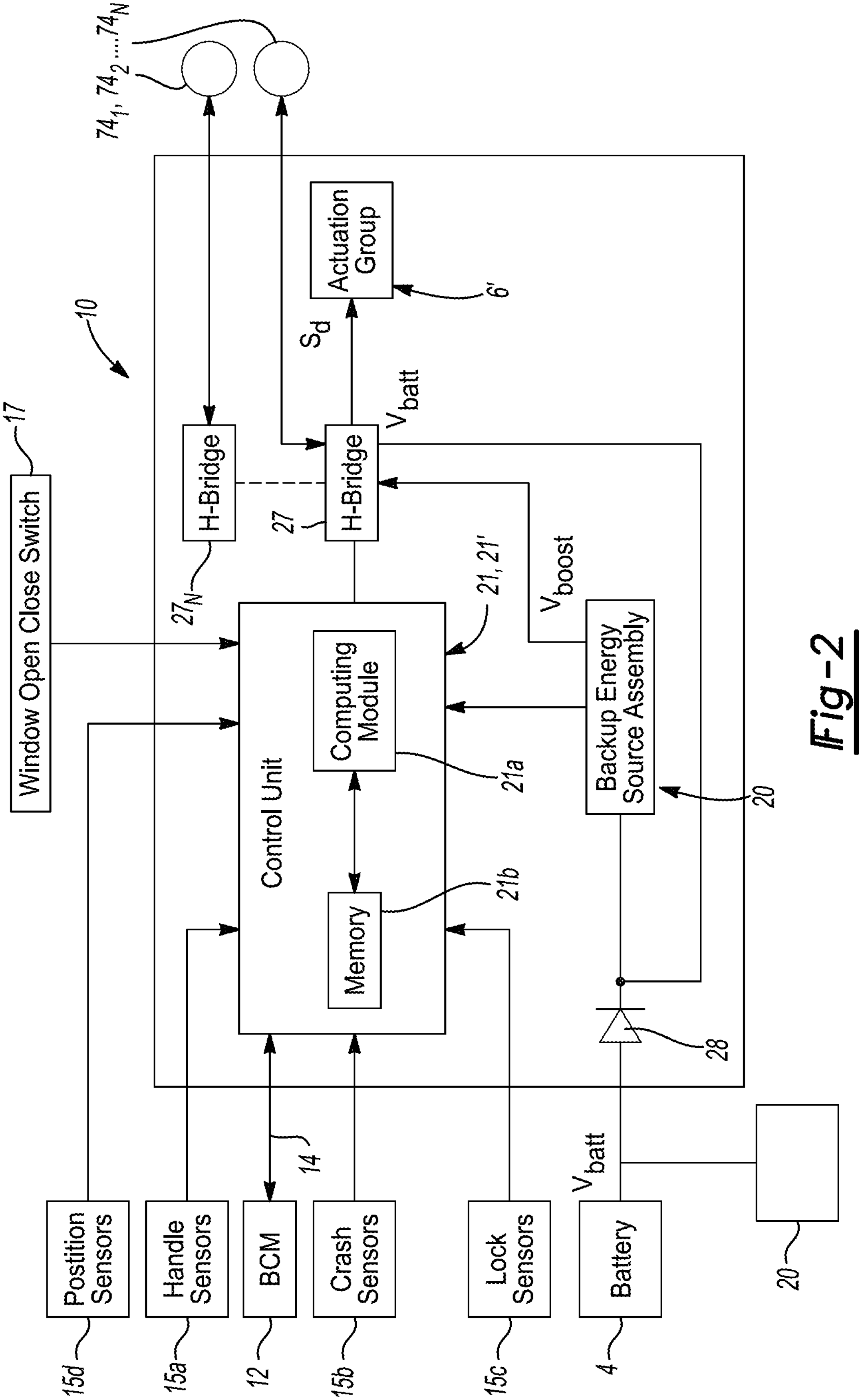
FIG. 2 is a general block diagram of an electronic control circuit of the latch assembly of FIG. 1 according to aspects of the disclosure.

Moreover, as best shown in FIG. 2, the electronic control circuit 10 is (directly, and/or indirectly via the vehicle management unit 12) coupled to a plurality of sensors 15 (shown schematically) of the motor vehicle 3, such as: handle-reading sensors 15*a* (which read actuation of external and/or internal handles 16*a*, 16*b*), a window open-close switch 17 for a user to command the window 13 to move upwardly or downwardly to close and open the window 13, crash sensors 15*b*, lock switch sensors 15*c*, and the like; conveniently, the electronic control circuit 10 also receives feedback information about the latch actuation from position sensors 15*d*, such as Hall sensors, configured to detect the operating position, for example of the ratchet 6 and/or pawl 8.

The electronic control circuit 10 is also coupled to the main power source 4 of the motor vehicle 3, so as to receive the battery voltage Vbatt; the electronic control circuit 10 is thus able to check if the value of the battery voltage Vbatt decreases below a predetermined threshold value, to promptly determine if an emergency or crash condition (when a backup energy source subassembly 20 may be needed) occurs. Backup energy source subassembly 20 may be provided remote from the latch housing 11, and in other locations.

So, the electronic control circuit 10 includes the backup energy source subassembly 20 (e.g., within the latch housing 11), which is configured to supply electrical energy (VBoost) to the actuation group 6' and latch electric motor 9, and to the electronic control circuit 10, in case of failure or interruption of the main power supply from the main power source 4 of the motor vehicle 3.

In more detail, the electronic control circuit 10 includes a latch controller 21, 21' for example provided with a microcontroller, microprocessor or analogous computing module 21*a*, coupled to the backup energy source subassembly 20 and the actuation group 6' of the latch assembly 1, 1', to control their operation. The electronic control circuit 10 also includes an output module, such as H-bridge module 27. It should be understood that the output module may be an integrated circuit, be constructed of discrete components, or even integrated with other elements of the electronic control circuit 10. In addition, one or more additional H-bridge modules $\mathbf{27}_N$ can be used to separately control the operation of multiple remote electric motors $\mathbf{74}_1$, $\mathbf{74}_2$, . . . $\mathbf{74}_N$ (e.g., one of the H-bridge modules $\mathbf{27}_N$ dedicated for each of the multiple remote electric motors $\mathbf{74}_1$, $\mathbf{74}_2$, . . . $\mathbf{74}_N$). Alternatively, if a single H-bridge module 27 is used, the multiple remote electric motors $\mathbf{74}_1$, $\mathbf{74}_2$, $\mathbf{74}_N$ can be driven one at a time. A main power diode 28 is connected in between the main power source 4 and the backup energy source subassembly 20 to ensure current only flows away from the main power source 4 (i.e., its cathode terminal is connected to the backup energy source subassembly 20 and its anode terminal is connected to the main power source 4 for receiving Vbatt).

The latch controller 21, 21' has an embedded memory 21*b*, for example a non-volatile random access memory 21*b*, coupled to the computing module 21*a*, storing suitable programs and computer instructions (for example in the form of a firmware) encompassing algorithms for execution by the computing module 21*a* of the motor monitoring and control methods and techniques as described herein. For example, instructions and code stored on the embedded memory 21*b* may also be related to various system modules, for example application programming interfaces (API) modules, drive API, digital input output API, Diagnostic API, Communication API, and communication drivers for LIN communications and CAN bus communications with a body control module (BCM) or other vehicle systems. While modules or units may be described as being loaded into the embedded memory 21*b*, it is understood that the modules or units could be implemented in hardware and/or software. It is recognized that the latch controller 21, 21' may alternatively comprise a logical circuit of discrete components to carry out the functions of the computing module 21*a* and memory 21*b*.

According to another aspect, the backup energy source subassembly 20 includes a group of low voltage supercapacitors (hereinafter supercap group), as an energy supply unit (or energy tank) to provide power backup to the latch assembly 1, 1' even in case of power failures. Supercapacitors may include electrolytic double layer capacitors, pseudocapacitors or a combination thereof. While the backup energy source subassembly 20 can include the supercap group, it should be appreciated that the backup energy source subassembly can include a battery or other energy storage device.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

Figure 3:
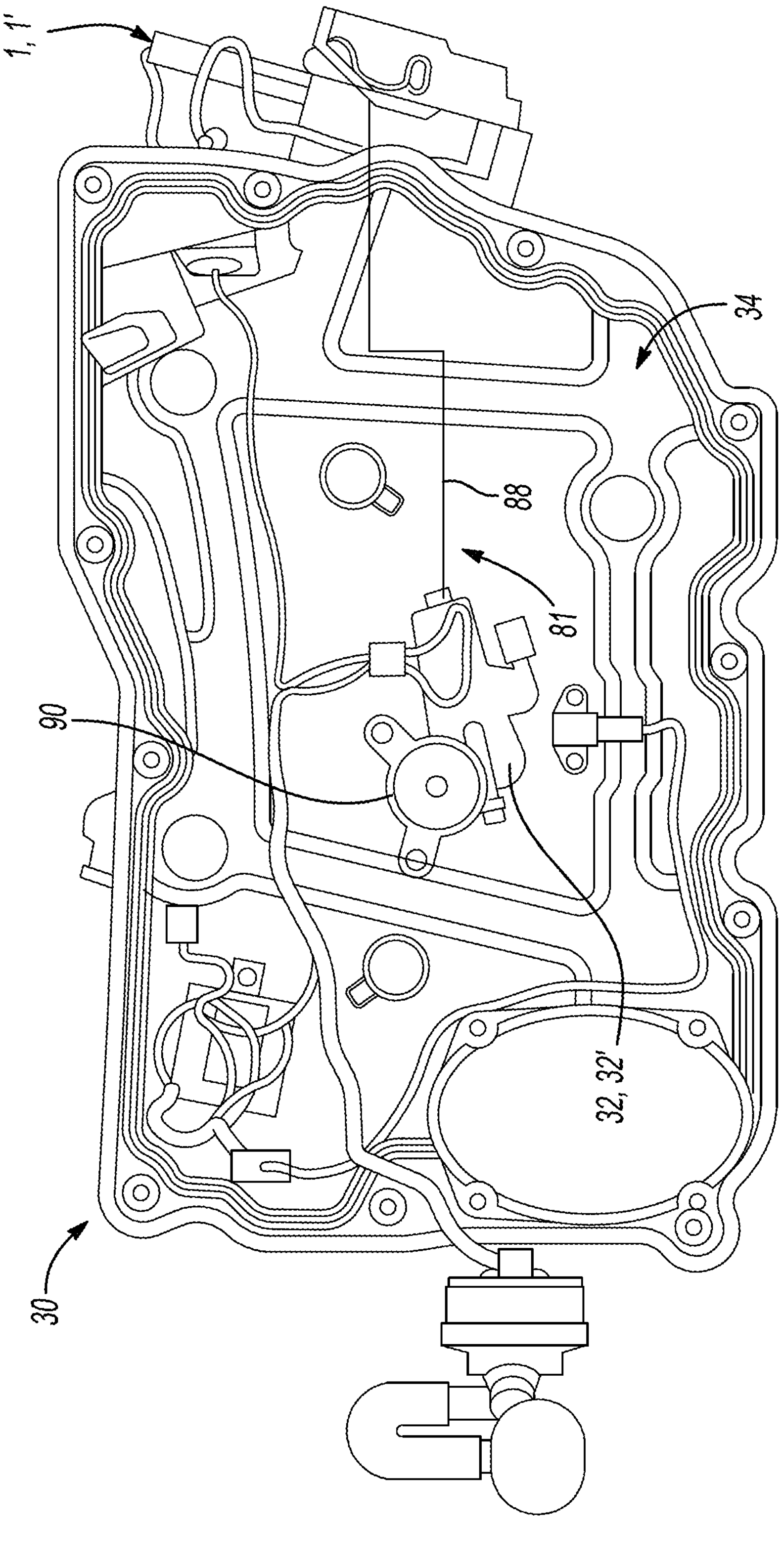
FIG. 3 is a plan view of a first side of a door module including the latch assembly according to aspects of the disclosure.

As best shown in FIG. 3, an example door module 30 is provided for attachment to the door 2 of the motor vehicle 3. The door module 30 is equipped with the latch assembly 1, 1' and a window regulator 32 secured to a carrier 34 of the module 30 (e.g., the carrier 34 then attaches to the door 2). The door 2 can, for example, include a structural door body made up of an inner sheet metal door panel joined to an outer sheet metal door panel along their peripheries, so as to define an internal door cavity between the inner and outer door panels.

Latch assembly 1, 1' is configured not to have mechanical linkages and/or mechanical connector mechanisms to the outside and inside door handles 16 of the door 2. Instead, the door 2 can be unlocked and released by the electrically commanded, power-operated actuation group 6' in response to an electrical signal coming from the latch controller 21 of the latch assembly 1, 1'. By providing an electrically commanded operation of the latch assembly 1, 1' the openings, through-holes, or like interfaces typically present many conventional door modules for accommodating the passage of mechanical linkages and/or mechanical connector mechanisms, or other connector types, between the wet side and the dry side of the door module 30 can be reduced and/or eliminated, thereby also providing for enhanced sealing of the door module 30 with less likelihood of water ingress there between.

Figure 4:
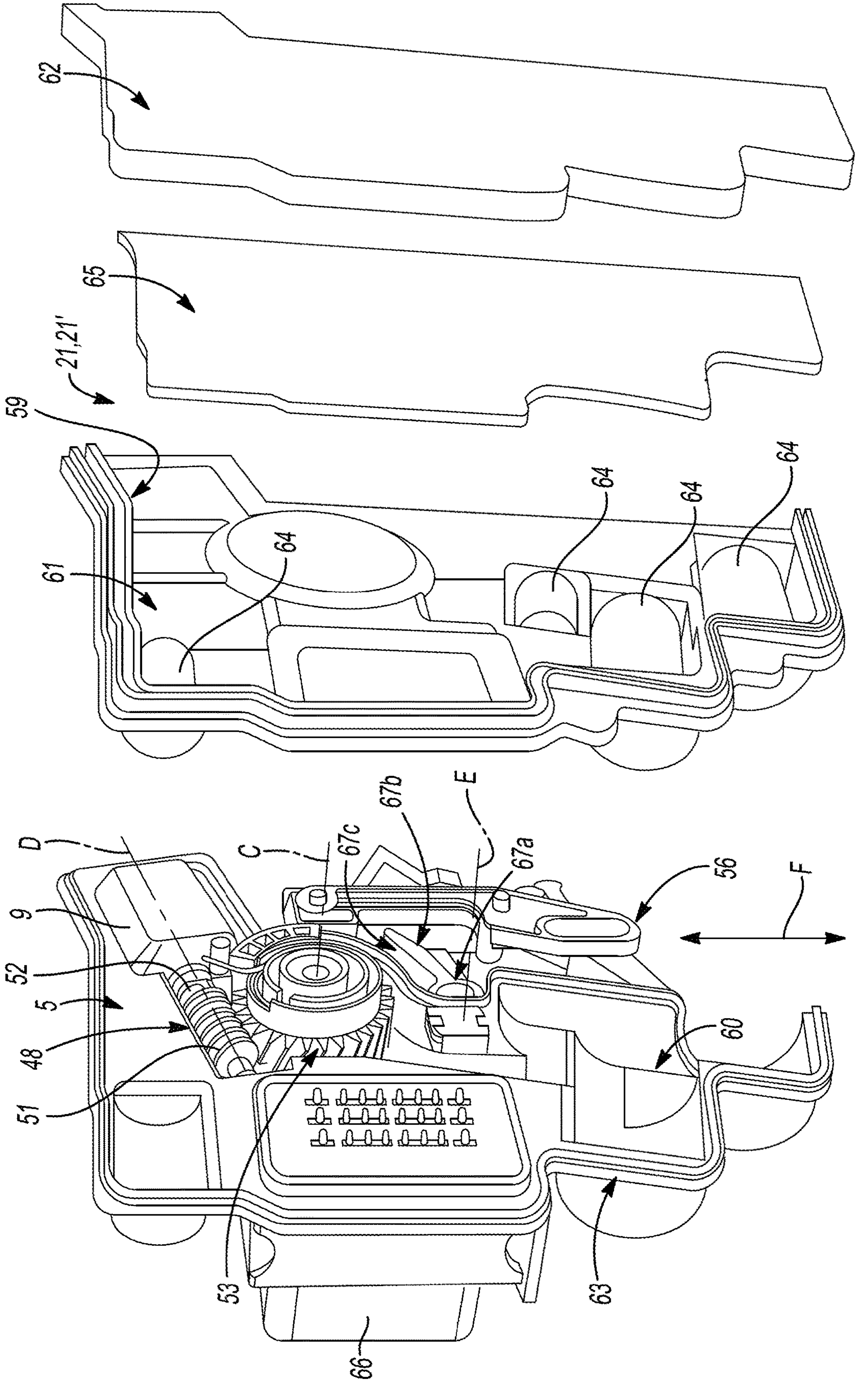
FIG. 4 is an exploded side perspective view of a part of the latch assembly of FIGS. 1-3 according to aspects of the disclosure.

FIG. 4 illustrates an exploded side perspective view of a part of the latch assembly 1, 1' of FIGS. 1A, 1B, 2, and 3. The latch housing 11 of the latch assembly 1, 1' internally houses, in a fluid-tight manner, latch electric motor 9, worm gear 51 and gear wheel 53; the other components of the latch assembly 1, 1', e.g., sector gear 55 and actuating lever 56, are all externally carried by latch housing 11. Gear wheel 53 is fitted onto a common shaft of axis C, externally protruding, in a fluid-tight manner, from latch housing 11. In practice, worm gear 51 and gear wheel 53 define a first transmission 48 housed, in a fluid-tight manner, inside latch housing 11 and directly driven by latch electric motor 9.

The latch housing 11 has a sandwich structure and defines two distinct chambers 59, 60, one of which (chamber 59) houses, in a fluid-tight manner, latch controller 21 and the other one (chamber 60) houses, in a fluid-tight manner, latch electric motor 9 and transmission 48, e.g., worm gear 51 and gear wheel 53. More specifically, latch housing 11 comprises a central plate 61 and two cover elements 62, 63, arranged on opposite sides of plate 61 and peripherally coupled thereto in a fluid-tight manner to define the opposite chambers 59, 60.

Chamber 59 houses a printed circuit board 65 and a plurality of capacitors 64 connected to printed circuit board 65 and including latch controller 21 and other elements of the electronic control circuit 10. Cover element 63 delimits, with plate 61, chamber 60 and carries externally gear wheel 54, sector gear 55 and actuating lever 56.

Plate 61 defines a plurality of seats for capacitors 64; the connection of the capacitors 64 to the printed circuit board 65 is made by press-fit connectors, known per se and not shown. Cover element 62 defines a plurality of seats for latch electric motor 9, worm gear 51 and gear wheel 53, which are closed on the opposite side by plate 61. Cover element 62 also houses an electric connector 66 for connecting electronic control circuit 10 to an electrical system of the motor vehicle 3 (e.g., to the BCM 12).

Latch electric motor 9 is housed in the portion of cover element 62 defining the upper part of latch housing 11; gear wheel 53, sector gear 55 and actuating lever 56 are all arranged inferiorly with respect to latch electric motor 9. Latch electric motor 9 and worm gear 51 have an axis D orthogonal to axis C. Latch electric motor 9 and worm gear 51 are rotated in opposite directions to perform a release function and a reset function respectively. Gear wheel 53 is mounted for rotation about axis C and receive actuation forces from worm gear 51; in greater detail, gear wheel 53 is driven by worm gear 51.

Sector gear 55 is mounted for rotation about a fixed pin having an axis E parallel to axis C and spaced therefrom. Sector gear 55 further comprises three cam surfaces 67*a*, 67*b*, 67*c* for interacting with actuating lever 56. Cam surface 67*b* acts in the same direction as cam surface 67*a* and is adapted to cooperate with actuating lever 56 to move the latter along a release stroke. In particular, sector gear 55 is rotated by latch electric motor 9, worm gear 51 and gear wheel 53 about axis E in a primary direction to produce release of the latch, and in a secondary direction, opposite to the first direction, to obtain reset of an auxiliary ratchet to an enabling position, in which the auxiliary ratchet allows closure of the latch by slamming the door 2 (or other closure panel 2, 2').

Actuating lever 56 is carried by the latch housing 11 in a displaceable manner along respective longitudinal direction F. Release and reset strokes of actuating lever 56 is defined by opposite movements of such lever 56 along the respective longitudinal direction F.

Figure 5:
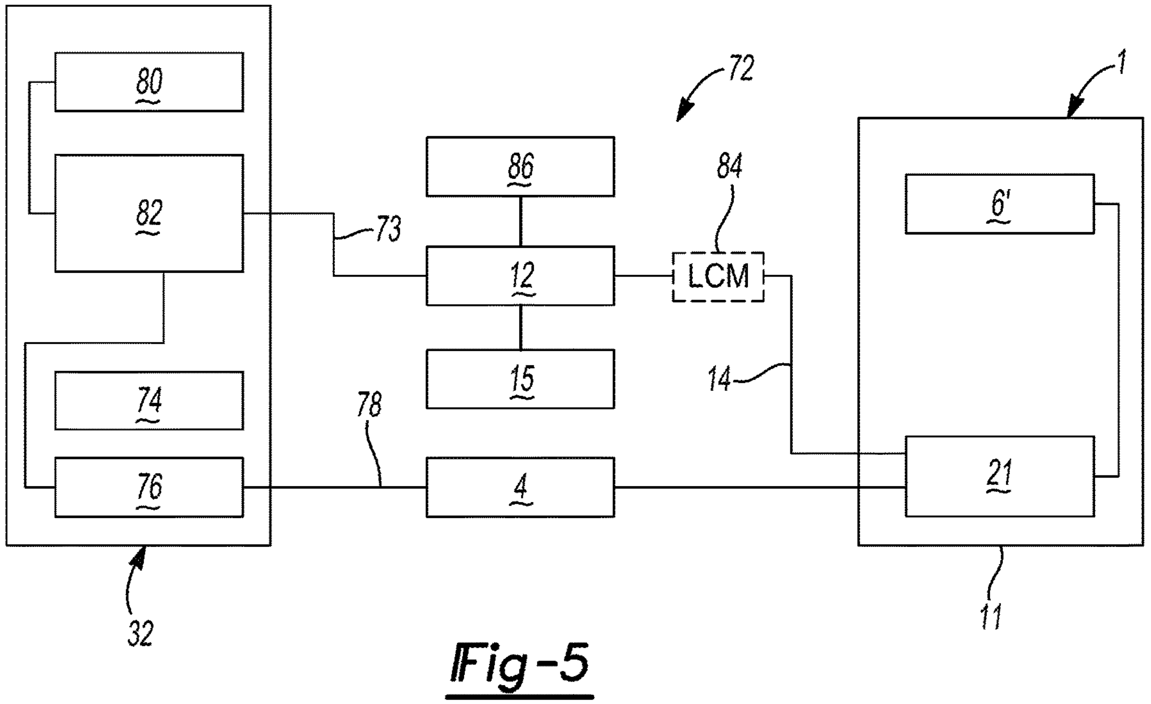
FIG. 5 is a block diagram of a first closure system according to aspects of the disclosure.

As best shown in FIG. 5, a first closure system 72 can include the actuator assembly 32 (e.g., window regulator), disposed remotely from the latch housing 11 having a remote electric motor 74 and actuator power electronics 76 (e.g., transistors) coupled to the main power source 4 via a power line 78, actuator position sensors 80 for sensing a position of the window 13 and/or the remote electric motor 74, an actuator controller 82 (including software and hardware) electrically coupled to the actuator position sensors 80 and the actuator power electronics 76 for monitoring and controlling movement of the remote electric motor 74 and for the window regulator, the position of the window 13 is thereby controlled. Generally, the electronic control circuit 10 may be configured to monitor the state of the actuator assembly 32 including the remote electric motor 74, either directly or indirectly through the detection of the position and/or speed of the remote electric motor 74. For example, a state of a door presenter or actuator may be determined based on a number or rotations of the remote electric motor 74 from an extended position to a retracted position, or a position there between; for example the state of a door lock mechanism may be determined on the number of rotations of a door lock motor for moving a lock mechanism from a locked state to an unlocked state; for example the state of a latch cinch mechanism may be determined on the number of rotations of a cinch motor for moving a cinch mechanism from an uncinched state to a cinched state.

The actuator controller 82 can communicate through a communication line 73 with the BCM 12 and/or a latch control module (LCM)/door node module 84 (or a Door Control Module, or Door Control Unit). A Door Control Unit or Module (DCU or DCM) is an embedded system, typically supported within the closure member interior cavity that controls a number of electrical systems associated with an advanced motor vehicle closure panel. The Door Control Unit is responsible for controlling and monitoring various electronic accessories in a vehicle's door. Since most of the vehicles have more than one door, DCUs may be present in each door separately, or a single centralised one provided. A DCU associated with the driver's door has some additional functionalities. This additional features are the result of complex functions like locking, driver door switch pad, child lock switches, etc., which are associated with the driver's door. In most of the cases driver door module acts as a master and others act as slaves in communication protocols. So, the LCM 84 may either take the place of the BCM 12 or may be coupled to the BCM 12. As shown, the BCM 12 may also be in communication with a key fob 86 (e.g., carried by an operator of the motor vehicle 3) and in communication with or coupled to the plurality of sensors 15 (in contrast to the plurality of sensors 15 being in direct communication with the latch controller 21, as shown in FIG. 2). In such an arrangement, the states of the plurality of sensors 15 can be communicated via a data bus 14 from the BCM 12 to the latch controller 21.

Referring back to FIG. 1B, instead of the actuator assembly 32, 32' comprising the window regulator shown in FIG. 1A, the remote electric motor 74 of the actuator assembly 32, 32' can instead comprise of a lift gate actuator coupled to at least one of a plurality of electromechanical biasing members 68*a*, 68*b* at a first pivot connection 69*a* on a body 3*a* of the motor vehicle 3. Each of the plurality of electromechanical biasing members 68*a*, 68*b* also includes an extension member 70 coupled to a second pivot connection 69*b* disposed on the lift gate 2'. Each of the plurality of electromechanical biasing members 68*a*, 68*b* can, for example, be a spring loaded strut. The extension member 70 is used to extend from, or retract within, each of the plurality of electromechanical biasing members 68*a*, 68*b* to effect a resulting location of the lift gate 2' with respect to the vehicle body 3*a* of the motor vehicle 3. For example, an extended extension member 70 results in positioning the lift gate 2' in an open state, while a retracted extension member 70 results in positioning the lift gate 2' in a closed state with respect to the vehicle body 3*a*. It is recognized that each of the plurality of electromechanical biasing members 68*a*, 68*b*, incorporating the remote electric motor 74, can be implemented as a strut. The strut can be of a biasing type (e.g. spring and/or gas charge supplying the bias). As such, via the incorporation of the remote electric motor 74, the strut is driven by the remote electric motor 74 with optionally spring and/or gas charge supplying the bias.

Figure 6A:
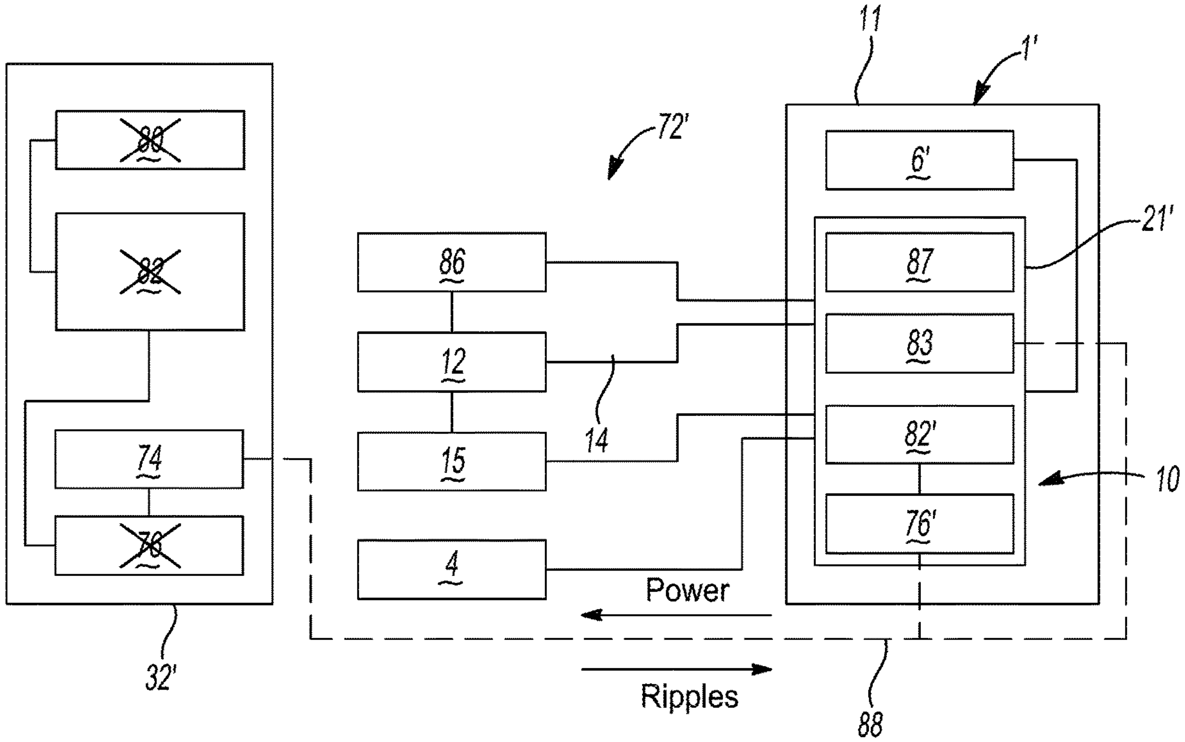
FIG. 6A is a block diagram of a second closure system according to aspects of the disclosure.

A second closure system 72' is shown in FIG. 6A and instead of the actuator assembly 32 (e.g., window regulator or lift gate actuator) having actuator power electronics 76, actuator position sensors 80, and an actuator controller 82, shown in FIG. 5, the window regulator 32' of the second closure system 72' instead utilizes the latch assembly 1', specifically latch controller 21' with a motor voltage and current sensing circuit 83, actuator controller 82', and actuator power electronics 76' (all as part of electronic control circuit 10) to monitor and control movement of the remote electric motor 74 and thus the position of the window 13 (if the remote electric motor 74 is part of the window regulator configured to move the window 13 as in FIG. 1A) or lift gate 2' (if the remote electric motor 74 is incorporated in the electromechanical biasing members 68*a*, 68*b* of FIG. 1B). In other words, the actuator controller 82', actuator power electronics 76', and any pinch detection algorithms 87 are integrated into the latch assembly 1'.

Figure 6B:
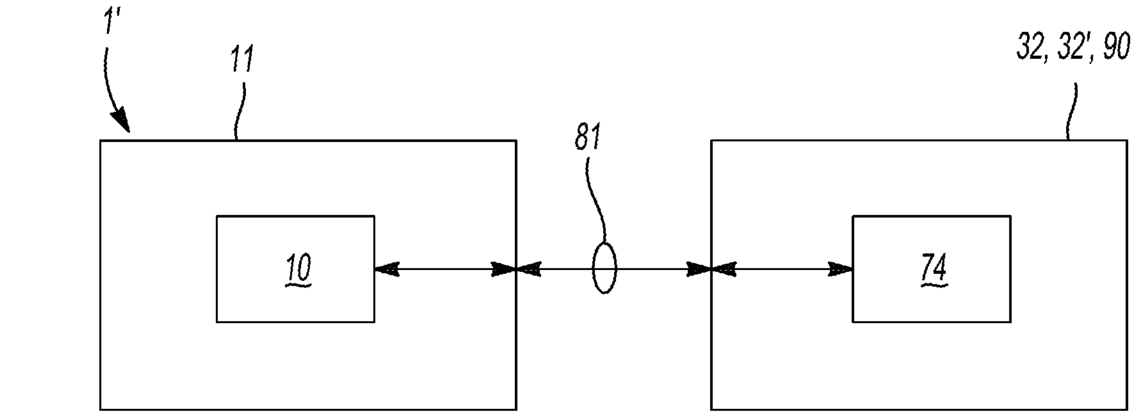
FIG. 6B is a block diagram of another closure system according to aspects of the disclosure.

Now referring to FIG. 6B, there is illustrated a latch assembly 1' having the housing 11 for housing the electronic control circuit 10, the electronic control circuit 10 electrically connected to the remote electric motor 74 for controlling the operation of remote electric motor 74, such as for example supplying power over signal line 81, and may also be configured for sensing the position of the remote electric motor 74 using signals transmitted over the signal lines 81 and received by the electronic control circuit 10. Actuator assembly 32 may therefore for example only include the remote electric motor 74 without the requirement of a controller circuit and associated printed circuit board, hardware and software components, and any other connections to the actuator assembly 32 other than from the electronic control circuit 10.

Figure 6C:
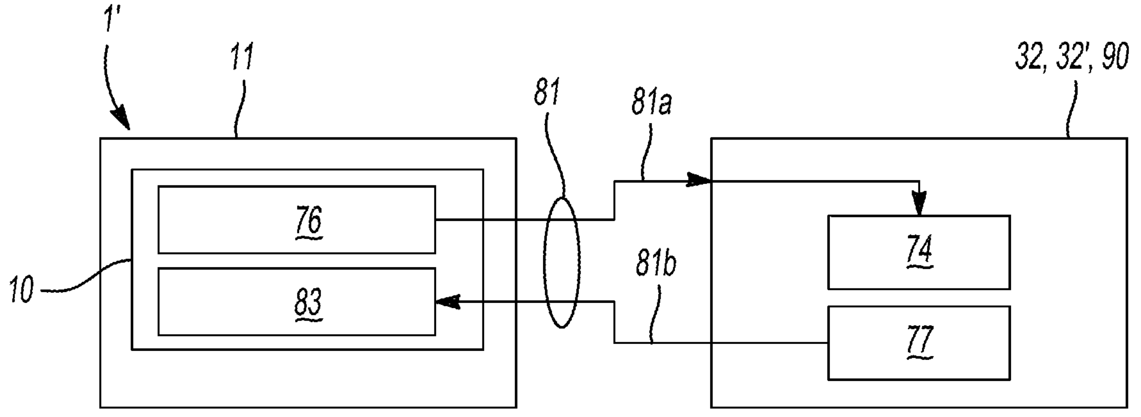
FIG. 6C is a block diagram of another closure system according to aspects of the disclosure.

Now referring to FIG. 6C, there is illustrated a latch assembly 1' having the housing 11 for housing the electronic control circuit 10, the electronic control circuit 10 including power electronics, such as the H-bridge 27 and power Field Effect Transistors as examples only which are controlled by the electronic control circuit 10, electrically connected to the remote electric motor 74 for controlling the operation of remote electric motor 74, such as for example supplying power over power signal line 81*a*, and may also be configured for sensing the position of the remote electric motor 74 using hall effect signals from a hall effect sensor 77 transmitted over the dedicated hall effect signal line 81*b* and received by the hall effect sensing circuitry 83 of electronic control circuit 10. Actuator assembly 32 may therefore for example only include the remote electric motor 74 and a Hall Effect sensor 77 and magnet, without the requirement of a controller circuit and associated printed circuit board, hardware and software components, and any other connections to the actuator assembly 32 other than from the electronic control circuit 10.

Figure 6D:
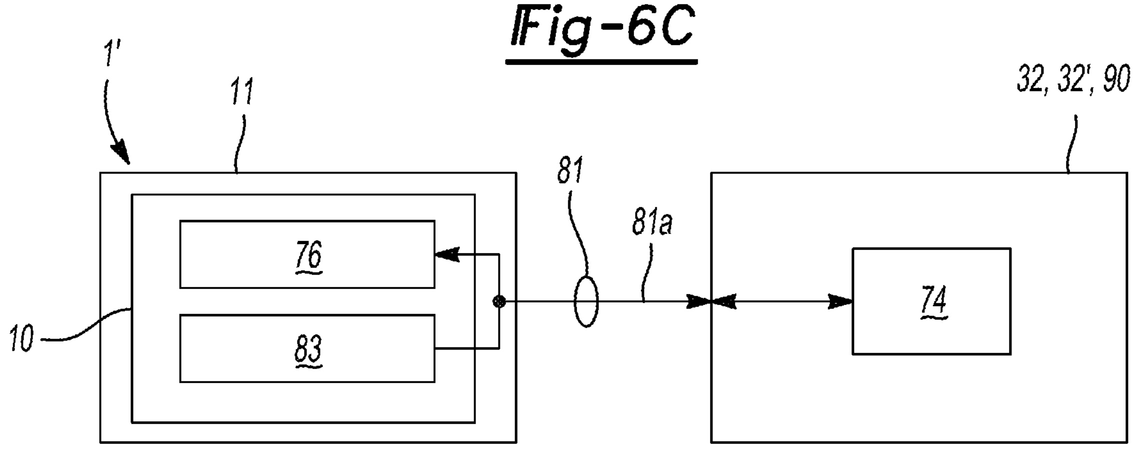
FIG. 6D is a block diagram of another closure system according to aspects of the disclosure.

Now referring to FIG. 6D, there is illustrated a latch assembly 1' having the housing 11 for housing the electronic control circuit 10, the electronic control circuit 10 including power electronics, such as the H-bridge 27 and power Field Effect Transistors as examples only which are controlled by the electronic control circuit 10, electrically connected to the remote electric motor 74 for controlling the operation of remote electric motor 74, such as for example supplying power over power signal lines 81*c*, such as a pair of wires electrically coupled to the terminals 83*a*, 83*b* of the motor and may also be configured for sensing the position of the remote electric motor 74 using sensed back EMF generated ripples, also referred to as commutation ripples, transmitted over power signal line 81*a* and received by the ripple detection sensing circuitry 83 of electronic control circuit 10. Actuator assembly 32 may therefore for example only include the remote electric motor 74 with a pair of motor terminals 83*a*, 83*b*, directly coupled to the electronic control circuit 10 without the requirement of a controller circuit and associated printed circuit board, hardware and software components, and any other connections to the actuator assembly 32 other than from the electronic control circuit 10.

The latch controller 21' communicates through a data bus 14 with the BCM 12 and additionally is coupled to or in communication with the key fob 86 and the plurality of sensors 15. A shielded cable 88 is coupled between the remote electric motor 74 and the latch assembly 1' (e.g., to the motor voltage and current sensing circuit 83 and the actuator power electronics 76'). Sensed motor current signals as well as back EMF voltage signals generated by the rotation of the remote electric motor 74 may be illustratively received by the latch controller 21' through the shielded cable 88. It is recognized that hall sensors 77 electrically connected to the latch controller 21' may be provided with the remote electric motor 74 to provide position and speed signals to the latch controller 21' over the dedicated communication signal line 81*b*.

So, instead of the separate actuator controller 82 of FIG. 5, the latch controller 21' of the latch assembly 1' is instead configured to control the electric motor 74 of the window regulator 32', eliminating the need for complex software in the actuator controller 82 and simplifying the hardware of the closure system 72'. Specifically, the motor voltage and current sensing circuit 83 in latch assembly 1' senses a motor current and a motor voltage of the remote electric motor 74 and outputs a motor current signal and a motor voltage signal and the latch controller 21' powers the remote electric motor 74 through the actuator power electronics 76' of the latch assembly 1'.

Figure 7:
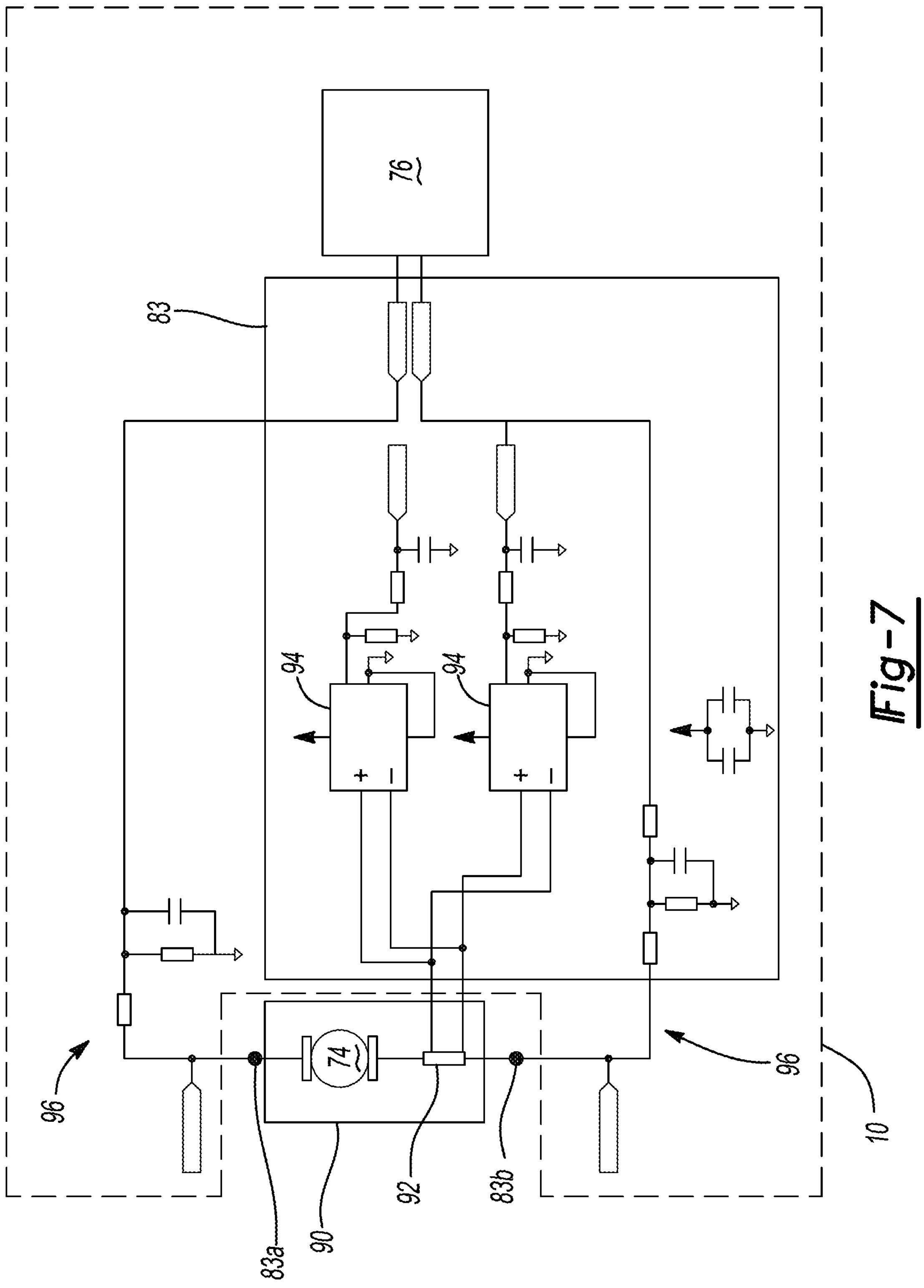
FIG. 7 illustrates a motor voltage and current sensing circuit of the latch assembly of the second closure system according to aspects of the disclosure.

As best shown in FIG. 7, the remote electric motor 74 is part of a remote motor assembly 90 (e.g., part of window regulator 32, 32' that is configured to drive a coupling 75, such as a geartrain having cables, lifterplates, gear reduction units, and the like, for driving a window regulator assembly for moving the window 13) that also includes a four-terminal shunt resistor 92 (e.g., Bourns CST0612) in series with the remote electric motor 74. Alternatively, the four-terminal shunt resistor 92 could instead be part of the motor voltage and current sensing circuit 83. Two current sense amplifiers 94 (e.g., Texas Instruments INA286-Q1) are coupled to the four-terminal shunt resistor 92 to sense current in two directions (a first rotational direction and second rotational direction of the remote electric motor 74 opposite the first rotational direction).

The motor voltage and current sensing circuit 83 also includes two voltage dividers 96 that are also coupled to the four-terminal shunt resistor 92 to provide voltage sensing in two directions. Again, the voltage dividers 96 could instead be part of the remote motor assembly 90. While the motor voltage and current sensing circuit 83 can be implemented as illustrated, it should be appreciated that the motor voltage and current sensing circuit 83 could instead be implemented using various other circuits capable of sensing the motor current and motor voltage of remote electric motor 74.

Figure 7A:
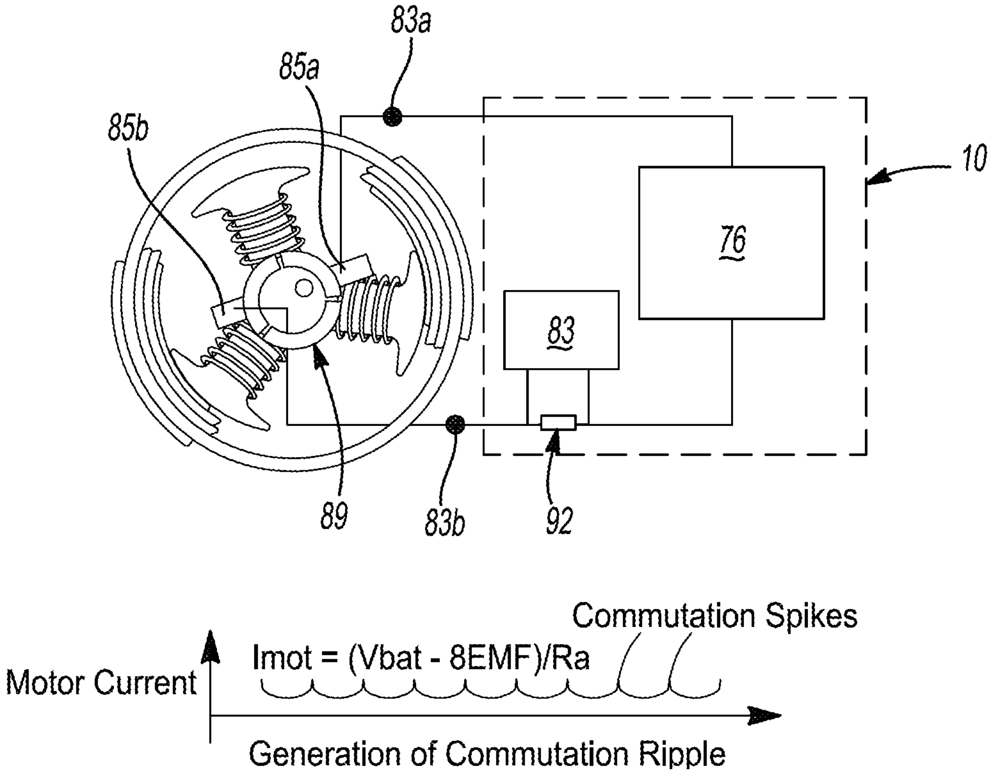
FIG. 7A illustrates a commutated brushless electrical motor electrically coupled to an electronic control unit for sensing ripples generated by the commutated brushless electrical motor.
Figure 7B:
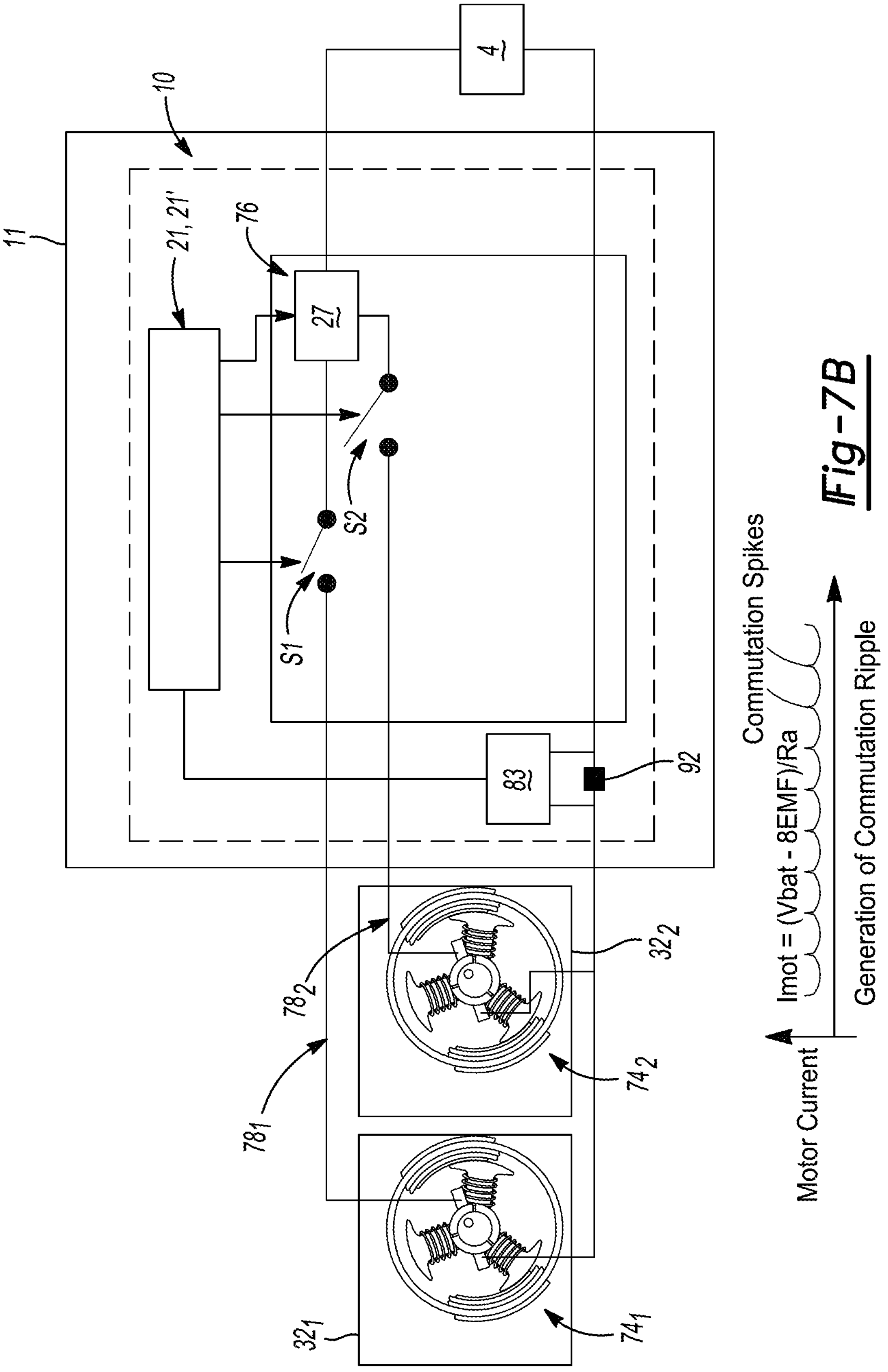
FIG. 7B illustrates a multiple commutated brushless electrical motor electrically coupled to an electronic control unit for sensing ripples generated by the commutated brushless electrical motors.
Figure 7C:
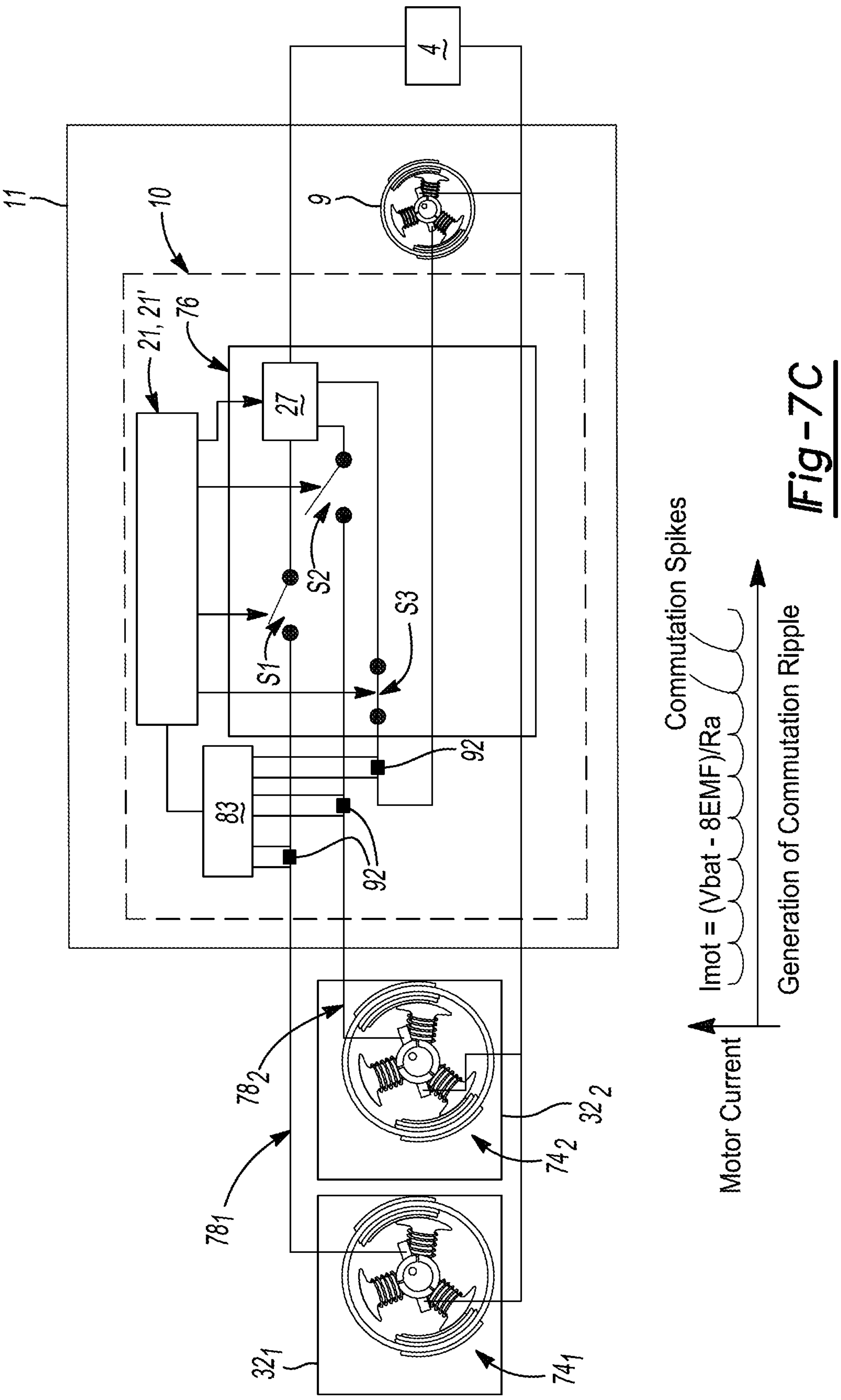
FIG. 7C illustrates a multiple commutated brushless electrical motor electrically coupled to an electronic control unit for sensing ripples generated by the commutated brushless electrical motors, in accordance with another illustrative embodiment.

FIG. 7A illustrates the electrical connections from motor terminals 83*a*, 83*b* with the brushes 85*a*, 85*b* coupled to commutator 89. FIG. 7B illustrates a control circuit for controlling multiple remote electric motors $\mathbf{74}_1$ and $\mathbf{74}_2$ (e.g., of separate actuator assemblies 321, 322) by the electronic control circuit 10. Controller 21, 21' controls operation of switches S1, and S2 for controlling power flow to remote electric motors $\mathbf{74}_1$ and $\mathbf{74}_2$ respectively. H-bridge 27 provides current direction control for controlling the direction or rotation of the remote electric motor 74. Current sensing circuit 83 detects a generated commutation ripple from either remote electric motors $\mathbf{74}_1$ and $\mathbf{74}_2$. As controller 21, 21' controls operation of switches S1, and S2, controller 21 determines which motor 74 is generating detected commutation ripples. Current sensing circuit 83 is capable of detecting a commutation ripple when a single motor 74 is operated. FIG. 7C illustrates a control circuit for controlling multiple remote electric motors 74 by the electronic control circuit 10. Controller 21, 21' controls operation of switches S1, and S2 for controlling power flow to remote electric motors $\mathbf{74}_1$ and $\mathbf{74}_2$ respectively. It should be appreciated that switches S1, and S2 are only switched on one at a time (e.g., switch S1 is on and switch S2 is off or switch S2 is on and switch S1 is off). H-bridge 27 provides current direction control for controlling the direction or rotation of the remote electric motor 74. Current sensing circuit 83 detects a generated commutation ripple from either remote electric motors $\mathbf{74}_1$ and $\mathbf{74}_2$. As controller 21, 21' controls operation of switches S1, and S2, controller 21, 21' determines which motor 74 is generating detected commutation ripples. Current sensing circuit 83 is capable of detecting multiple commutations ripple one each dedicated power supply line $\mathbf{78}_{1,2}$ when each motor is operated simultaneously. It is recognized that latch electric motor 9 may be controlled in a similar manner, as illustrated with switch S3 of FIG. 7C in a closed state, with S1, and S2 in an open state as an illustrative example only.

The latch controller 21, 21' is configured to monitor and control the at least one actuation group 6'. The latch controller 21, 21' also determines at least one of an estimated motor speed of the remote electric motor 74 based on the motor current signal and the motor voltage signal (e.g., using a direct current motor model). According to an aspect, the latch controller 21, 21' can use an electrical equation representing a permanent magnet direct current motor model to continuously estimate a shaft speed of the remote electric motor 74 from the acquisition of the motor voltage signal and the motor current signal. Thus, the latch controller 21, 21' controls the remote electric motor 74 using at least one of the motor current signal and the motor voltage signal.

Nevertheless, if remote electric motor 74 is a mechanically commutated electric motor, shielded cable 88 can provide power to the remote electric motor 74 and ripples of motor current are received by the motor voltage and current sensing circuit 83. Specifically, the direct current (DC) part of the motor current signal can be computed using a digital filter (e.g., moving average), and the DC part can be subtracted from the motor current signal to isolate an alternating current (AC) part of the motor current signal containing ripple pulses or plurality of ripple peaks (caused by the commutation of the motor brush of remote electric motor 74). It should be appreciated that the remote electric motor could instead be a brushless direct current electric motor or other type of electric motor.

The latch controller 21' can then analyze each of a plurality of possible peaks within a time window of a predetermined peak detection time. According to an aspect, the alternating current part of the motor current signal containing the plurality of ripple peaks is analyzed to count the peaks of the signal, both rising and falling peaks. The quantity of the peaks that are counted can then be used by the latch controller 21, 21' to determine the motor rotational position and/or motor speed of the remote electric motor 74. So, the latch controller 21, 21' is configured to detect and count the plurality of ripple peaks of the motor current signal and determine at least one of the motor rotational position and the motor speed of the remote electric motor 74 based on a quantity of the plurality of ripple peaks counted.

As discussed above, the at least one actuation group 6' can include the ratchet 6 selectively rotatable to engage the striker 7 fixed to the body 3*a* of the motor vehicle 3. Thus, according to aspects of the disclosure, the latch controller 21, 21' is further configured to monitor a cinching position of the ratchet 6 and determine an initiation of cinch based on the cinching position. The latch controller 21, 21' can then activate the remote electric motor 74 in response to an initiation of cinch to begin moving a window 13 coupled to and movable by the remote electric motor 74 toward an upper frame of the body 3*a* of the motor vehicle 3. The latch controller 21, 21' can ensure the window 13 has not engaged the upper frame before the ratchet 6 of the at least one actuation group 6' reaches a primary position.

Because the electronic control circuit 10 can include the backup energy source subassembly 20 disposed in the latch housing 11 and configured to supply electrical energy to the latch assembly in case of failure or interruption of a main power source 4 of the motor vehicle 3, the latch controller 21, 21' can be further configured to monitor at least one crash sensor 15*b* in communication with the latch controller to determine if there is a crash event. The latch controller 21, 21' may also monitor at least one handle sensor 15*a* in communication with the latch controller to determine actuation of at least one of the internal handle 16*a* and the external handle 16*b* of the closure panel 2, 2'. Then, the latch controller 21, 21' can utilize electrical energy from the backup energy source subassembly 20 for a latch electric motor 9 of the at least one actuation group 6' to unlatch the latch assembly 1, 1' and power the remote electric motor 74 in response to determining there is a crash event and in response to determining actuation of at least one of the external handle 16*b* and the internal handle 16*a* of the closure panel 2, 2'.

The latch controller 21, 21' may also be configured to move the window 13 coupled to and movable by the remote electric motor 74 to a short drop position using the remote electric motor 74 allowing the closure panel 2, 2' to be moved past a seal of the closure panel 2, 2' without deflecting the seal in response to determining there is a crash event and in response to determining actuation of at least one of the external handle 16*b* and the internal handle 16*a* of the closure panel 2, 2'. The latch controller 21, 21' can additionally be configured to monitor for and detect a lock signal from the key fob 86 in communication with the latch controller 21, 21'. The latch controller 21, 21' can then determine whether the window 13 coupled to and movable by the remote electric motor 74 is in an open position in response to detecting the lock signal from the key fob 86. Consequently, the latch controller 21, 21' may control the latch electric motor 9 of the at least one actuation group 6' to latch the latch assembly 1, 1' and control the remote electric motor 74 to close the window 13 in response to determining the window 13 is in the open position.

Figure 8:
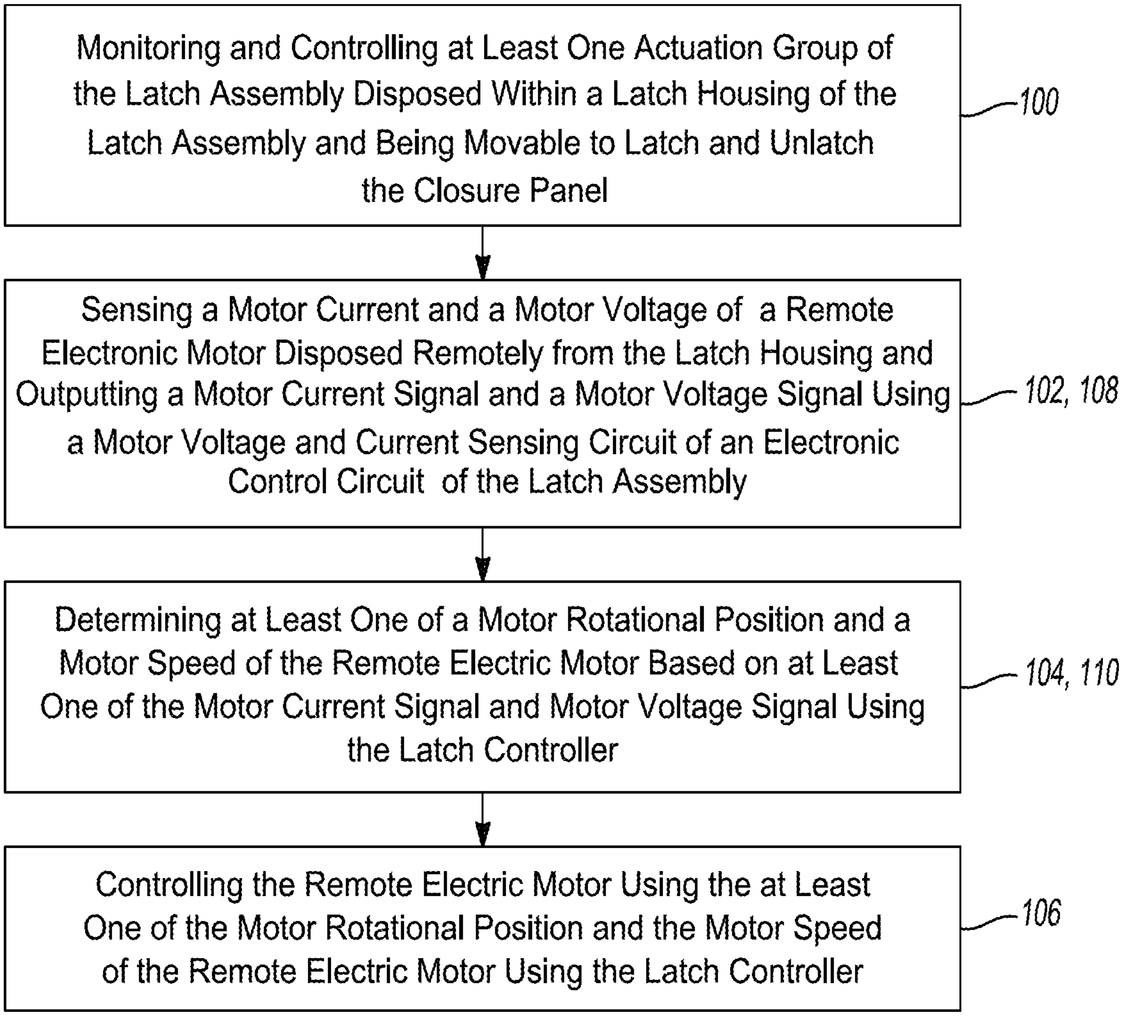
FIGS. 8-11 illustrate steps of a method of operating the latch assembly of the closure panel of the motor vehicle according to aspects of the disclosure.

As best shown in FIGS. 8-11, a method operating a latch assembly 1, 1' of a closure panel 2, 2' of a motor vehicle 3 is also provided. Referring to FIG. 8, the method includes the step of 100 monitoring and controlling at least one actuation group 6' of the latch assembly 1, 1' disposed within a latch housing 11 of the latch assembly 1, 1' and being movable to latch and unlatch the closure panel 2, 2'. The method proceeds with the step of 102 sensing a motor current and a motor voltage of a remote electric motor 74 disposed remotely from the latch housing 11 and outputting a motor current signal and a motor voltage signal using a motor voltage and current sensing circuit 83 of an electronic control circuit 10 of the latch assembly 1, 1'. The method continues by 104 determining at least one of a motor rotational position and a motor speed of the remote electric motor 74 based on at least one of the motor current signal and the motor voltage signal using the latch controller 21, 21'. The method also includes the step of 106 controlling the remote electric motor 74 using the at least one of the motor rotational position and the motor speed of the remote electric motor 74 using the latch controller 21, 21'.

As discussed above, the remote electric motor 74 may be a mechanically commutated direct current electric motor. Thus, continuing to refer to FIG. 8, the step of 102 sensing the motor current and the motor voltage of the remote electric motor 74 disposed remotely from the latch housing 11 and outputting the motor current signal and the motor voltage signal using the motor voltage and current sensing circuit 83 of the electronic control circuit 10 of the latch assembly 1, 1' includes the step of 108 detecting and counting a plurality of ripple peaks in the motor current signal of the remote electric motor 74 electrically coupled to the latch assembly 1, 1' using the motor voltage and current sensing circuit 83 of the electronic control circuit 10 of the latch assembly 1, 1'. Similarly, the step of 104 determining at least one of the motor rotational position and the motor speed of the remote electric motor 74 based on at least one of the motor current signal and the motor voltage signal includes 110 determining at least one of the motor rotational position and the motor speed of the remote electric motor 74 based on a quantity of the plurality of ripple peaks counted using the latch controller 21, 21'.

Figure 9A:
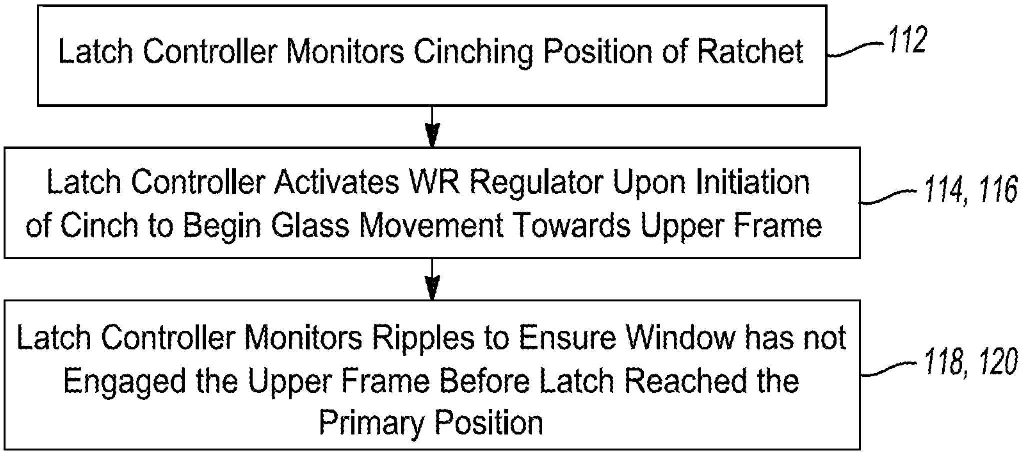

Referring to FIG. 9A, the method can include the steps of 112 monitoring a cinching position of a ratchet 6 of the at least one actuation group 6' using the latch controller 21, 21'. Next, 114 determining an initiation of cinch based on the cinching position using the latch controller 21, 21'. The method can continue with the step of 116 activating the remote electric motor 74 in response to an initiation of cinch to begin moving the window 13 coupled to and movable by the remote electric motor 74 toward an upper frame of a body 3*a* of the motor vehicle 3 using the latch controller 21, 21'. The method can additionally include the step of 118 ensuring the window 13 has not engaged the upper frame before the ratchet 6 of the latch assembly 1, 1' reaches a primary position using the latch controller 21, 21'. If the remote electric motor 74 is a mechanically commutated direct current electric motor, the step of 118 ensuring the window 13 has not engaged the upper frame before the ratchet 6 of the latch assembly 1, 1' reaches a primary position using the latch controller 21, 21' includes 120 monitoring a plurality of ripple peaks in the motor current signal of the remote electric motor 74 electrically coupled to the latch assembly 1, 1'. Thus, the window 13 may be sealed more quickly, since the latch controller 21, 21' monitors the cinching position of a ratchet 6 and also controls the remote electric motor 74 to move the window 13.

Figure 9B:
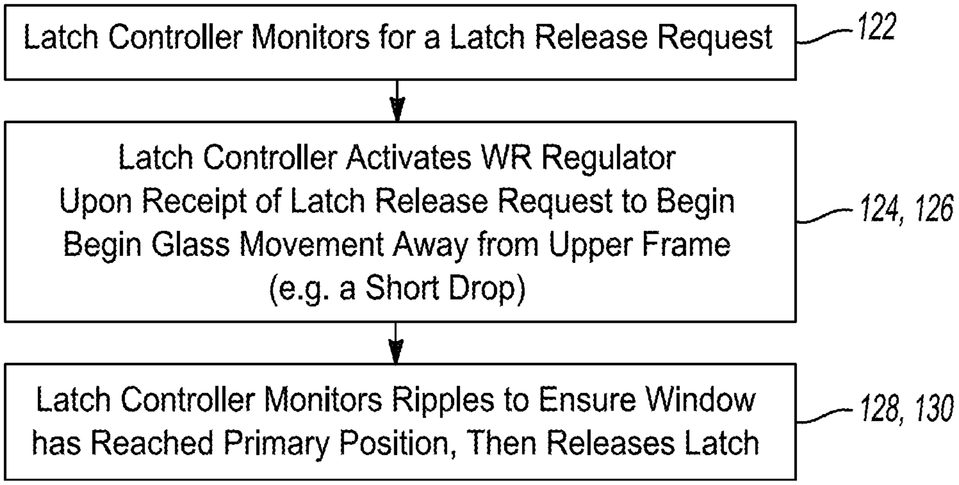

Referring to FIG. 9B, the method can include the steps of steps of 122 monitoring for a latch release request using the latch controller 21, 21'. Next, 124 receiving the latch release request using the latch controller 21, 21'. The method can continue with the step of 126 activating the remote electric motor 74 in response to an initiation of cinch to begin moving the window 13 coupled to and movable by the remote electric motor 74 away from the upper frame of the body 3*a* of the motor vehicle 3 using the latch controller 21, 21'. The method can additionally include the step of 128 ensuring the window 13 has reached a short drop position (e.g., a predetermined distance L below a fully closed position as shown in FIG. 1A) and then releasing the ratchet 6 of latch assembly 1, 1' (with the at least one actuation group 6') using the latch controller 21, 21'. If the remote electric motor 74 is a mechanically commutated direct current electric motor, the step of 128 ensuring the window 13 has reached the short drop position and then releasing the ratchet 6 of latch assembly 1, 1' using the latch controller 21, 21' includes 130 monitoring the plurality of ripple peaks in the motor current signal of the remote electric motor 74 electrically coupled to the latch assembly 1, 1'.

Figure 10:
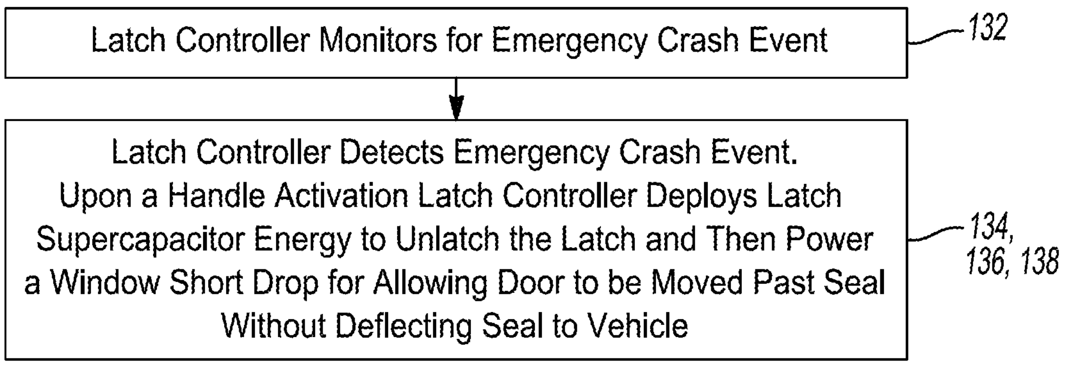

Referring to FIG. 10, the method can additionally include the step of 132 monitoring at least one crash sensor 15*b* in communication with the latch controller 21, 21' to determine if there is a crash event using the latch controller 21, 21'. The method can continue by 134 monitoring at least one handle sensor 15*a* in communication with the latch controller 21, 21' to determine actuation of at least one of the external handle 16*b* and the internal handle 16*a* of the closure panel 2, 2' using the latch controller 21, 21'. The method can also include the step of 136 utilizing electrical energy from a backup energy source subassembly 20 disposed in the latch housing 11 for a latch electric motor 9 of the at least one actuation group 6' to unlatch the latch assembly 1, 1' and power the remote electric motor 74 in response to determining there is a crash event and in response to determining actuation of at least one of the external handle 16*b* and the internal handle 16*a* of the closure panel 2, 2'. The method can also include the step of 138 moving a window 13 coupled to and movable by the remote electric motor 74 to a short drop position allowing the closure panel 2, 2' to be moved past a seal without deflecting the seal in response to determining there is a crash event and in response to determining actuation of at least one of the external handle 16*b* and the internal handle 16*a* of the closure panel 2, 2'.

Figure 11:
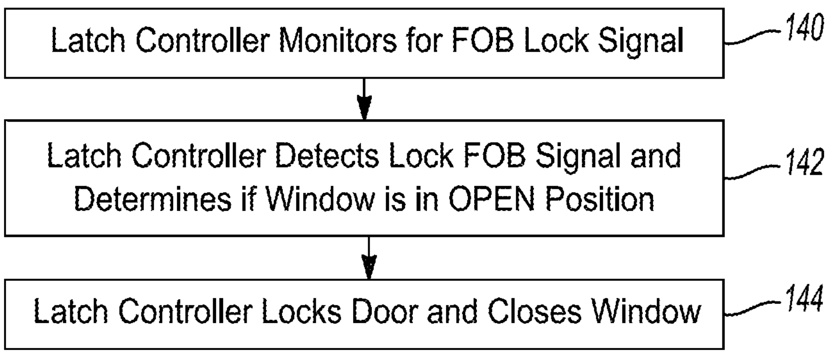

In FIG. 11, the method is shown as including the step of 140 monitoring for and detecting a lock signal from a key fob (FOB) 86 using the latch controller 21, 21'. Next, 142 determining whether a window 13 coupled to and movable by the remote electric motor 74 is in an open position in response to detecting the lock signal from the key fob 86 using the latch controller 21, 21'. The method proceeds with the step of 144 controlling a latch electric motor 9 of an actuation group 6' to latch the latch assembly 1, 1' and controlling a remote electric motor 74 to close the window 13 in response to determining the window 13 is in the open position using the latch controller 21, 21'.

Figure 12:
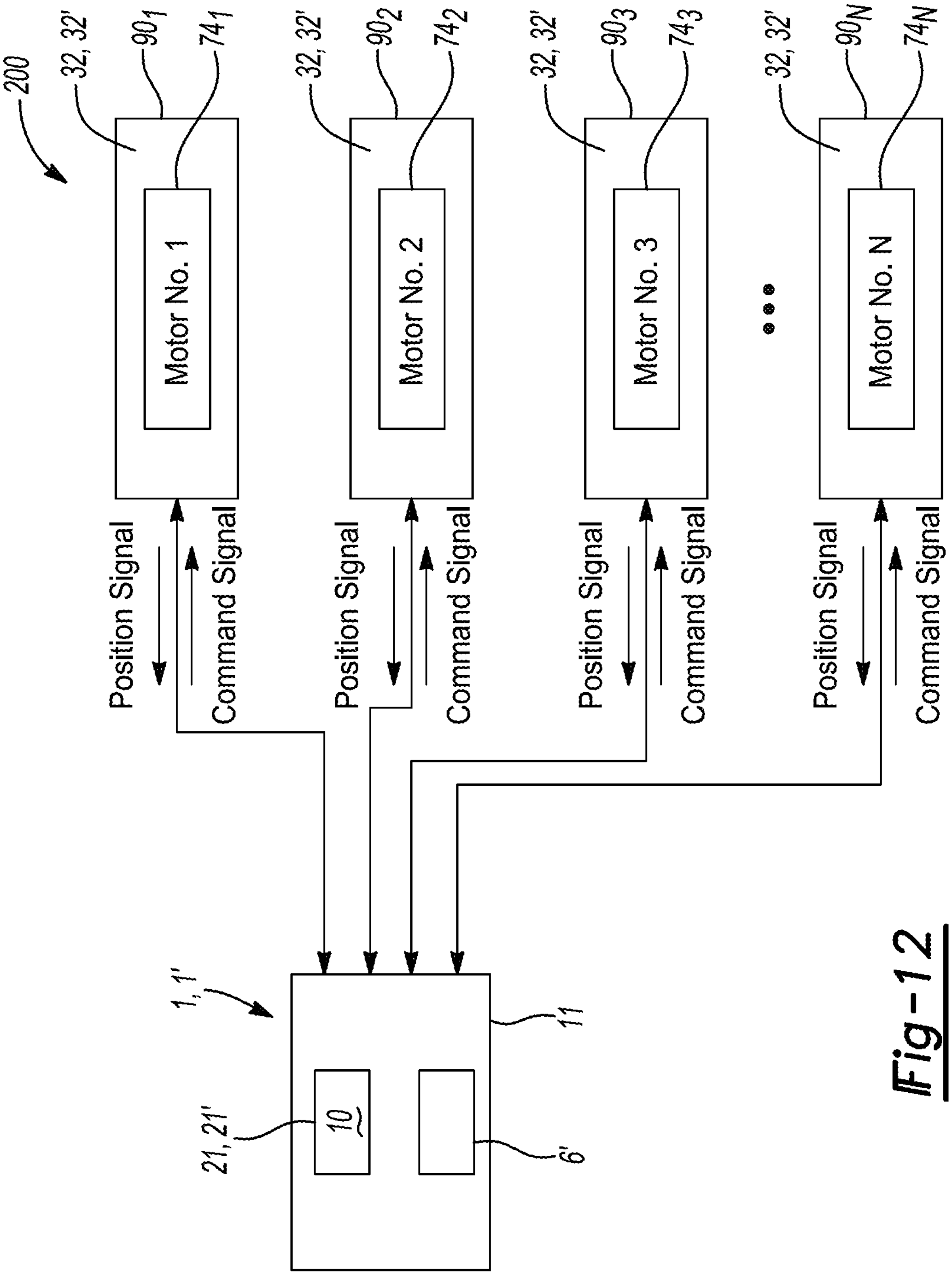
FIG. 12 illustrates a system of motors electrically connected to an controlled by a latch assembly.

Now referring to FIG. 12, there is illustrated a system 200 for controlling and/or monitoring at least one actuator assembly 32, 32' for the closure panel 2, 2' of the motor vehicle 3, including a latch assembly 1, 1' comprising the electronic control circuit 10 having the latch controller 21, 21' disposed within the latch housing 11 and coupled to the at least one actuation group 6'. The at least one remote electric motor 74 and at least one actuator assembly 32, 32' are in electrical connection with the electronic control circuit 10. The at least one remote electric motor $\mathbf{74}_1$, $\mathbf{74}_2$, $\mathbf{74}_3$, $\mathbf{74}_N$ (i.e., motor number 1, motor number 2, motor number 3, . . . motor number N) of the at least one actuator assembly 32, 32' is housed within a remote motor assembly $\mathbf{90}_1$, $\mathbf{90}_2$, $\mathbf{90}_3$, $\mathbf{90}_N$ disposed remotely from the latch housing 11. The latch controller 21, 21' is configured to monitor and control the at least one actuation group 6' and monitor and control the at least one remote electric motor $\mathbf{74}_1$, $\mathbf{74}_2$, $\mathbf{74}_3$, $\mathbf{74}_N$. For example remote motor assembly $\mathbf{90}_1$ may be a power release motor of a primary latch assembly 1, 1' of the door 2, remote motor assembly $\mathbf{90}_2$ may be the window regulator (WR) for moving the window 13, remote motor assembly $\mathbf{90}_3$ may be a door presenter or an ice breaker for moving the vehicle door 2 to a presented or partially open position, door remote motor assembly $\mathbf{90}_N$ may be a power release latch for secondary latch, for example when vehicle door 2 is configured as a sliding door having front and rear latches. Electronic control circuit 10 is therefor in electrical communication with the remote electric motors $\mathbf{74}_1$, $\mathbf{74}_2$, $\mathbf{74}_3$, $\mathbf{74}_N$ and is configured to control or command the remote electric motors $\mathbf{74}_1$, $\mathbf{74}_2$, $\mathbf{74}_3$, $\mathbf{74}_N$, for example by supplying power to the remote electric motors $\mathbf{74}_1$, $\mathbf{74}_2$, $\mathbf{74}_3$, $\mathbf{74}_N$. The electronic control circuit 10 is also configured to monitor the remote electric motors 74, for example by sensing the position, and velocity for example of the remote electric motors $\mathbf{74}_1$, $\mathbf{74}_2$, $\mathbf{74}_3$, $\mathbf{74}_N$. Door remote motor assemblies $\mathbf{90}_1$, $\mathbf{90}_2$, $\mathbf{90}_3$, $\mathbf{90}_N$ are provided as slaves, or dummy low cost motor assemblies, while the latch assembly 1, 1' including the electronic control circuit 10 is configured as a single master controller for controlling a scalable number of slave remote motor assemblies $\mathbf{90}_1$, $\mathbf{90}_2$, $\mathbf{90}_3$, $\mathbf{90}_N$. So, electronic control circuit 10 may be configured to control the at least one actuation group 6' and/or the at least one remote electric motor $\mathbf{74}_1$, $\mathbf{74}_2$, $\mathbf{74}_3$, $\mathbf{74}_N$ and monitor at least one of the position and speed of the at least one actuation group 6' and/or the at least one remote electric motor $\mathbf{74}_1$, $\mathbf{74}_2$, $\mathbf{74}_3$, $\mathbf{74}_N$.

Figure 13:
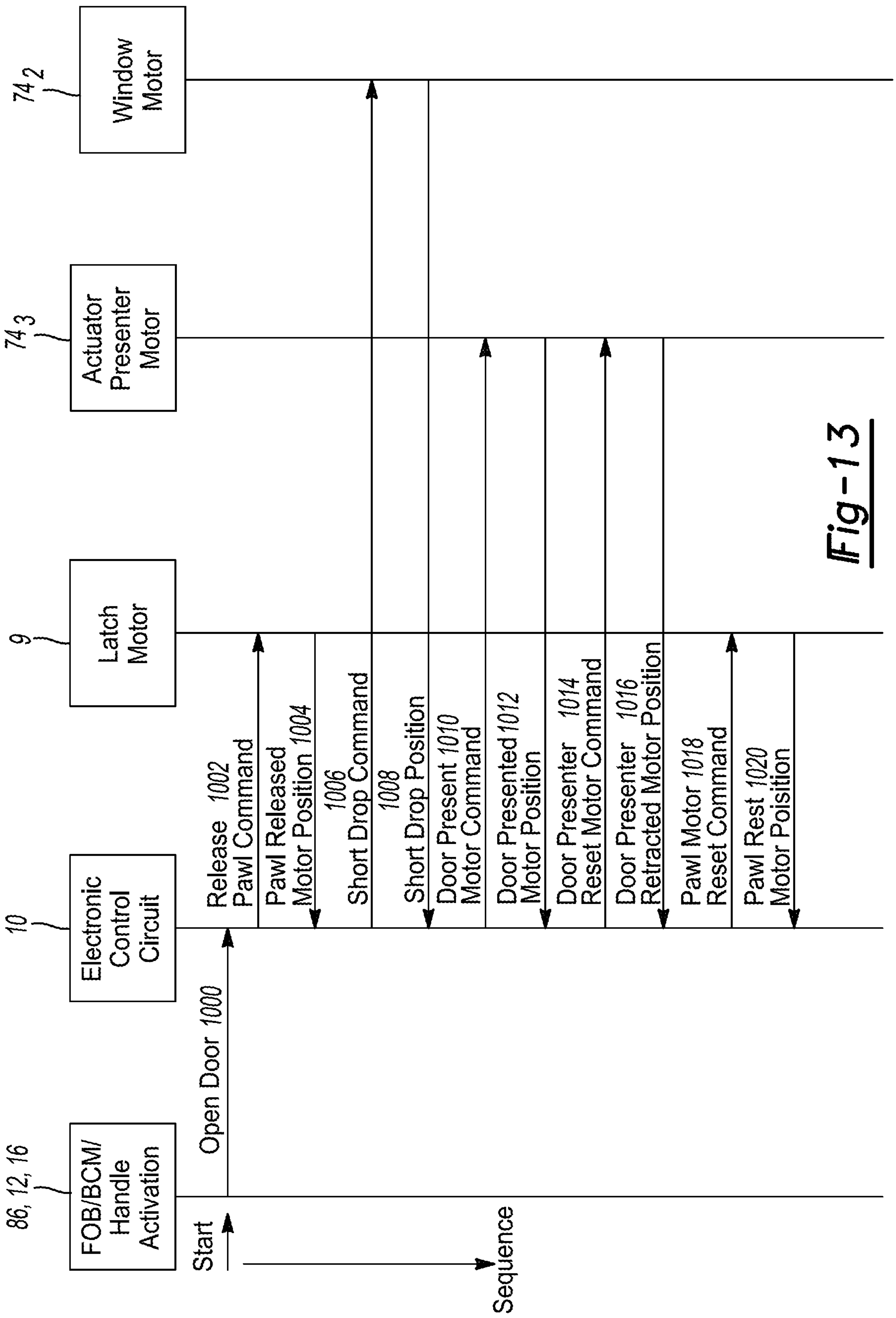
FIG. 13 illustrates operational sequencing diagram of a system of motors electrically connected to and controlled by a latch assembly, in accordance with an illustrative embodiment.

Now referring to FIG. 13, there is illustrated an operational sequencing diagram of a system of motors $\mathbf{74}_1$, $\mathbf{74}_2$, $\mathbf{74}_3$, $\mathbf{74}_N$ electrically connected to and controlled by an electronic control circuit 10 of the latch assembly 1, 1'. In the illustrative operation, the electronic control circuit 10 receives a powered open door command 1000 from the key fob 86, or BCM 12, internal handle 16*a*, or external handle 16*b*, for example. Electronic control circuit 10 issues a motor command 1002 to control the latch electric motor 9 to release the striker 7 from the ratchet 6. Electronic control circuit 10 senses the rotational position 1004 of the latch electric motor 9 indicating that the latch electric motor 9 has moved the pawl 8 to the ratchet release position and the ratchet 6 is free to rotate to the striker release position. The door 2 is now released from the latch assembly 1,1'. Next the electronic control circuit 10 issues a motor command 1006 to control the remote electric motor assembly $\mathbf{90}_2$ of a window regulator motor $\mathbf{74}_2$ to move the window 13 to a short drop position away from a door seal. Electronic control circuit 10 senses the rotational position 1008 of the window regulator motor $\mathbf{74}_2$ indicating that the remote motor assembly $\mathbf{90}_2$ has moved the window 13 to the short drop position so that the door 2 can be moved. Next the electronic control circuit 10 issues a motor command 1010 to control the remote motor assembly $\mathbf{90}_3$ of the remote door presenter to move the door 2 from a closed position to a partially opened position or presented position. Electronic control circuit 10 senses the rotational position 1012 of the presenter electric motor $\mathbf{74}_3$ indicating that the remote motor assembly $\mathbf{90}_3$ of the remote door presenter has moved the door 2 to the partially opened position. Next the electronic control circuit 10 issues a motor command 1014 to control the remote motor assembly $\mathbf{90}_3$ of the remote door presenter to move the presenter from a deployed position to a retracted position, to allow the door 2 to be closed if desired. Electronic control circuit 10 senses the rotational position 1016 of the presenter electric motor $\mathbf{74}_3$ indicating that the remote motor assembly $\mathbf{90}_3$ of the remote door presenter has moved from an extended position to a retracted position. Next the electronic control circuit 10 issues a motor command 1018 to control the latch electric motor 9 to move the pawl 8 to a reset position so that the ratchet 6 can be held in striker capture position upon a door closing, and to allow the door 2 to be maintained in the closed position. Electronic control circuit 10 senses the rotational position 1020 of the latch electric motor 9 indicating that the latch electric motor 9 has moved the pawl 8 into a striker holding position. As a result the electronic control circuit 10 of the latch assembly 1, 1', can control multiple motors, both remote electric motors $\mathbf{74}_1$, $\mathbf{74}_2$, $\mathbf{74}_3$, $\mathbf{74}_N$ and local motors 9, for example in a sequenced manner.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A latch assembly for a closure panel of a motor vehicle, comprising:

a latch housing for attachment to the closure panel;

at least one actuation group disposed within the latch housing and being movable to latch and unlatch the closure panel; and an electronic control circuit disposed within the latch housing and coupled to the at least one actuation group, and coupled to at least one remote electric motor of a remote motor assembly disposed remotely from the latch housing, the electronic control circuit configured to control the at least one actuation group and to control the at least one remote electric motor.

2. The latch assembly of claim 1, wherein the electronic control circuit is further configured to monitor the at least one actuation group and to monitor the at least one remote electric motor.

3. The latch assembly of claim 1, wherein the electronic control circuit comprises power electronics coupled to the at least one remote electric motor.

4. The latch assembly of claim 3, wherein the power electronics comprises an H-bridge.

5. The latch assembly of claim 1, wherein the at least one remote electric motor does not include an actuator controller.

6. The latch assembly of claim 1, wherein the at least one remote electric motor does not include power electronics.

7. The latch assembly of claim 1, wherein the at least one remote electric motor does not include power electronics and is not in communication with one of a Body Control Module and a Latch Control Module.

8. The latch assembly of claim 1, wherein the electronic control circuit and the at least one remote electric motor are coupled using a cable, wherein the cable is adapted to supply power to the at least one remote electric motor from the electronic control circuit.

9. The latch assembly of claim 8, wherein the electronic control circuit is adapted to monitor the at least one remote electric motor using signals from the at least one remote electric motor received using the cable.

10. The latch assembly of claim 9, wherein the electronic control circuit is adapted to monitor at least one of a position and a velocity of the at least one remote electric motor.

11. The latch assembly of claim 1, wherein the at least one remote electric motor is part of a side door actuator.

12. The latch assembly of claim 1, wherein the at least one remote electric motor is part of a liftgate actuator.

13. The latch assembly of claim 1, wherein the at least one remote electric motor is part of a door presenter.

14. The latch assembly of claim 1, wherein the at least one remote electric motor comprises two remote electric motors each being part of a powered strut for actuating a liftgate.

15. A system for controlling at least one actuator assembly for a closure panel of a motor vehicle, the system comprising:

a powered actuator having a remote electric motor configured for moving the closure panel;

a latch assembly having a latch electric motor for at least one actuation group; and an electronic control circuit coupled to the latch electric motor and to the remote electric motor, the electronic control circuit configured to control the latch electric motor and to control the remote electric motor.

16. The system of claim 15, wherein the electronic control circuit is further configured to monitor the at least one actuation group and to monitor the powered actuator.

17. The system of claim 15, wherein the electronic latch assembly is disposed within a latch housing of the latch assembly.

18. The system of claim 15, wherein the closure panel is a liftgate and the powered actuator is a powered strut.

19. The system of claim 18, wherein the system further comprises another powered actuator having another remote electric motor coupled to the electronic control circuit, the electronic control circuit further configured to control the another remote electric motor.

20. The system of claim 15, wherein the wherein the electronic control circuit comprises power electronics coupled to the remote electric motor.

* * * * *